United States Patent
Okamoto

(10) Patent No.: US 7,308,055 B2
(45) Date of Patent: Dec. 11, 2007

(54) TRANSMISSION METHOD WITH FADING DISTORTION OR FREQUENCY OFFSET COMPENSATION

(75) Inventor: Eiji Okamoto, Koganei (JP)

(73) Assignee: National Institute of Information and Communication Technology, Tokyo (JP)

( * ) Notice: Subject to any disclaimer, the term of this patent is extended or adjusted under 35 U.S.C. 154(b) by 759 days.

(21) Appl. No.: 10/337,736

(22) Filed: Jan. 8, 2003

(65) Prior Publication Data

US 2003/0128780 A1    Jul. 10, 2003

(30) Foreign Application Priority Data

Jan. 8, 2002 (JP) .............................. 2002-001829

(51) Int. Cl.
*H03D 1/04* (2006.01)
(52) U.S. Cl. ..................................... 375/346
(58) Field of Classification Search ........ 375/147–152, 375/316, 346
See application file for complete search history.

(56) References Cited

U.S. PATENT DOCUMENTS

| | | | | |
|---|---|---|---|---|
| 5,912,931 A | * | 6/1999 | Matsumoto et al. | ........ 375/340 |
| 6,219,391 B1 | * | 4/2001 | Nakano | ........ 375/346 |
| 6,519,300 B1 | * | 2/2003 | Ramesh | ........ 375/344 |
| 6,985,432 B1 | * | 1/2006 | Hadad | ........ 370/203 |
| 6,990,061 B2 | * | 1/2006 | Deneire et al. | ........ 370/203 |

FOREIGN PATENT DOCUMENTS

CA    2 415 170    6/2003

WO    WO 01/56239 A2    8/2001

OTHER PUBLICATIONS

E. Okamoto, et al., Technical Report of IEICE, vol. 101, No. 541, pp. 135-142, "A Pilot-Symbol-Assisted Fading and Frequency-Offset Compensation Method", Jan. 10, 2002 (with English Abstract).
E. Okamoto, et al., Technical Report of IEICE, vol. 98, No. 599, pp. 57-62, "Improving Bit Error Rate Performance Using Pilot Symbol Assisted Modulation", Feb. 19, 1999 (with English Abstract).
E. Okamoto, et al., Proceedings of The 1997 IEICE General Conference, (B-5-176), p. 563, "Pilot Symbol Assisted Frequency Offset Compensation for 16QAM", Mar. 6, 1997 (with partial English translation).
E. Okamoto, et al., Technical Report of IEICE, vol. 96, No. 99, pp. 7-12, "Rayleigh Fading Compensation for 16QAM Using FFT", Jun. 20, 1996 (with English Abstract).
E. Okamoto, et al., IEEE Transactions on Vehicular Technology, vol. 48, No. 5, pp. 1626-1633, "Rayleigh Fading Compensation for 16QAM Using FFT", Sep. 1999.

* cited by examiner

*Primary Examiner*—Chieh M. Fan
*Assistant Examiner*—Jason M. Perilla
(74) *Attorney, Agent, or Firm*—Oblon, Spivak, McClelland, Maier & Neustadt, P.C.

(57) ABSTRACT

A transmission method with compensation for fading distortion or frequency offset distortion in digital communications using pilot signals, comprises the steps of: receiving modulated radiofrequency signals, demodulating the digital signals carried by said radiofrequency signals, extracting pilot signals from the received radiofrequency signals or demodulated digital signals, finding a spectrum of the extracted pilot signals, finding fading components or frequency-offset components from said spectrum, and using one of these components to compensate the received radiofrequency signal or estimate the original digital signal from the demodulated digital signals.

23 Claims, 20 Drawing Sheets

FIG_1

FIG_3

FIG_4

FIG. 5
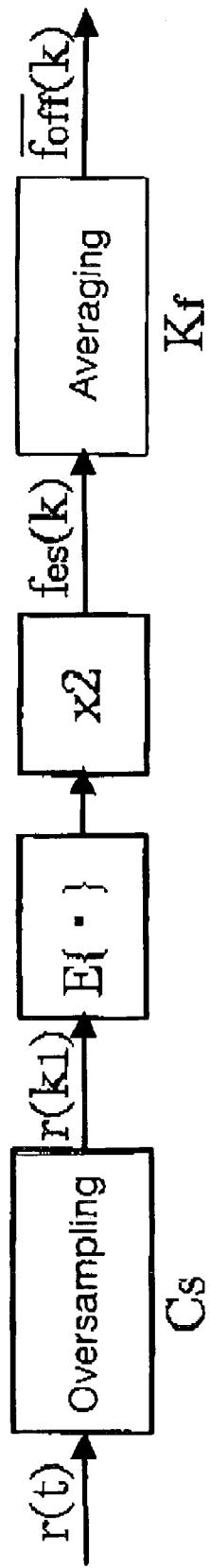
(a) For an open-loop system
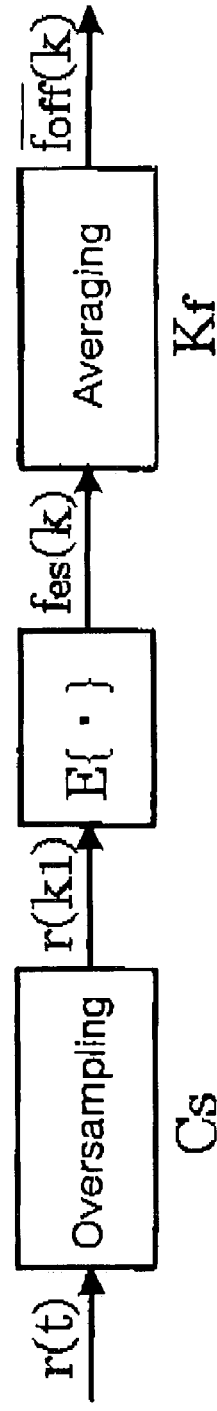
(b) For a closed-loop system

FIG_7

FIG_8

FIG_9

FIG_11

FIG_12

FIG_14

FIG_15

FIG_16

FIG_17

FIG_18

FIG_19

TRANSMISSION METHOD WITH FADING DISTORTION OR FREQUENCY OFFSET COMPENSATION

BACKGROUND OF THE INVENTION

1. Field of the Invention

The present invention relates to a means of simultaneously compensating for propagation path distortion and frequency offsets suffered by a moving station or the like in digital wireless communication, and to a method of compensating for fading or frequency offsets in a propagation environment wherein one or the other occurs in digital wireless communication, and particularly to transmission method with compensation for fading distortion and frequency offset compensation and used as a propagation path distortion-compensation technique using pilot signals in mobile wireless communication.

2. Description of the Prior Art

In digital wireless communication using moving stations, fading caused by various changes in the environment and frequency offsets arising due to the movement of the station are known to occur. FIG. 1 shows the frame structure in a first related art used to compensate for the fading and frequency offsets that occur when the station moves. The unique word shown in FIG. 1 is a known symbol sequence and the pilot symbol is a known symbol. The receiver estimates the frequency offset of this unique word portion and estimates the fading distortion from the pilot symbol, and compensates for each, respectively.

However, with this method, each type of compensation is performed with a different type of known symbol, thus complicating the structure of the transceivers and reducing the fraction occupied by the data portion so there is a problem in that the transmission rate is reduced, In addition, FIG. 2 shows an example of a second related art wherein two pilot symbols are disposed sequentially, and P1 or P2 or both are used to estimate fading and the frequency offset is estimated from the phase difference among the adjacent P1 and P2. This is a method of compensating for propagation path distortion by inserting two or more adjacent pilot symbols. However, with this method, phase differences between the adjacent P1 and P2 arising from the phase noise suffered by P1 and P2 occur, so the frequency offset may differ greatly from the estimated value of the frequency offset. In addition, if the phase difference reaches the vicinity of 180 degrees, the sign of the frequency may be reversed in the estimate.

Moreover, if three or more adjacent pilot symbols are used in order to reduce these phase errors, there is a problem in that the fraction occupied by the data portion is relatively reduced and the transmission rate is lowered.

As described above, with the first related art that uses unique words, there are problems in that the structure of the transceiver becomes complex and the fraction occupied by the data portion is reduced so that the transmission rate is lowered, and with the second related art that uses two consecutive pilot symbols, there are problems in that the frequency offset may be much different from the estimated value and if three or more adjacent pilot symbols are used, the fraction occupied by the data portion is relatively reduced, also lowering the transmission rate.

SUMMARY OF THE INVENTION

The present invention was made in consideration of the above and has as its object to provide a transmission method with compensation for fading distortion and frequency offset for use in mobile or fixed communication, whereby if frequency differences are present between the standard signal generators (oscillators) of the transmitter and receiver, this method can be used to compensate for these differences.

In order to achieve the aforesaid object, the first aspect of the present invention relates to a transmission method with compensation for fading distortion or frequency offset distortion in digital communications using pilot signals, comprising the steps of: receiving radiofrequency signals, demodulating the digital signals carried by said radiofrequency signals, extracting pilot signals from the received radiofrequency signals or demodulated digital signals, finding a spectrum of the extracted pilot signals, finding fading components or frequency-offset components from said spectrum, and using one of these components to compensate the received radiofrequency signal or estimate the original digital signal from the demodulated digital signals.

In addition, the second aspect of the present invention comprises said first aspect wherein furthermore said modulation method for radiofrequency signals used in digital communications is one of amplitude, frequency, phase or polarization modulation.

In addition, the third aspect of the present invention comprises said first or second aspect, but in order to improve accuracy by averaging the fading components or frequency-offset components with past values, it further comprises the steps of: mixing the fading components or frequency-offset components thus found with predetermined time-advanced fading components or frequency-offset components, and using the fading components or frequency-offset components obtained by this mixing to compensate the received radiofrequency signal or estimate the original digital signal from the demodulated digital signals.

In addition, the fourth aspect of the present invention comprises any of said first through third aspects, further comprising the steps of: sampling the received radiofrequency signals or demodulated digital signals at a predetermined frequency, using these sampled signals as periodic pilot symbols and finding their spectrum, finding fading components or frequency-offset components from said spectrum, and using one of these components to compensate the received radiofrequency signal or estimate the original digital signal from the demodulated digital signals.

In addition, the fifth aspect of the present invention comprises any of said first through fourth aspects, but even if the error in the estimated value of the frequency-offset estimator is large, the frequency offset is estimated within a certain range from the pilot symbols that tolerates this error, so in order to compensate for fading and frequency offsets with good accuracy, it further comprises the steps of: at the time of finding the fading components or frequency-offset components, performing an evaluation of the fading bandwidth by a predetermined method, and depending on these results, changing the method of finding the fading components or frequency-offset components.

In addition, the sixth aspect of the present invention comprises any of said first through fifth aspects, wherein furthermore: the method of demodulating the digital signals is a method using a base frequency signal, and feedback of said fading components or frequency-offset components is provided to said base frequency.

In addition, the seventh aspect of the present invention comprises any of said first through sixth aspects, wherein furthermore: as the values of the frequency-offset components provided as feedback, values increased or decreased by an integral multiple of the inverse of the transmission symbol interval time are used.

In addition, the eighth aspect of the present invention comprises said sixth aspect, but in order for the compensation of frequency offsets to be performed accurately, it is further characterized in that: the values of the frequency-offset components provided as feedback are automatically caused to converge to an integral multiple of the inverse of the transmission symbol interval time, and thereby the error between the values of the frequency-offset components provided as feedback and their true values is assumed to be zero.

In addition, the ninth aspect of the present invention comprises any of said first through eighth aspects, further comprising the steps of: using an open-loop system structure to find frequency-offset components, and use these components to compensate the received radiofrequency signal or estimate the original digital signal from the demodulated digital signals.

In addition, the tenth aspect of the present invention comprises any of said first through ninth aspects, further comprising the steps of: finding the spectrum of extracted pilot signals, and limiting the frequency-offset components found from said spectrum to within the bandwidth of the receiving low-pass filter.

In addition, the eleventh aspect of the present invention comprises any of said first through fifth aspects, but in order to reduce the amount of computation required while preserving high estimation accuracy, it further comprises the steps of: varying the proportion of the number of frames on which compensation is performed depending on the value of the fading component found from said spectrum.

In addition, the twelfth aspect of the present invention comprises said eleventh aspect, wherein furthermore: the proportion of the number of frames on which compensation is performed is varied as to be inversely proportional to the bandwidth of fading.

BRIEF DESCRIPTION OF THE DRAWINGS

FIG. 5 is a diagram showing a simple frequency offset estimator.

DESCRIPTION OF THE PREFERRED EMBODIMENTS

Figure 1:
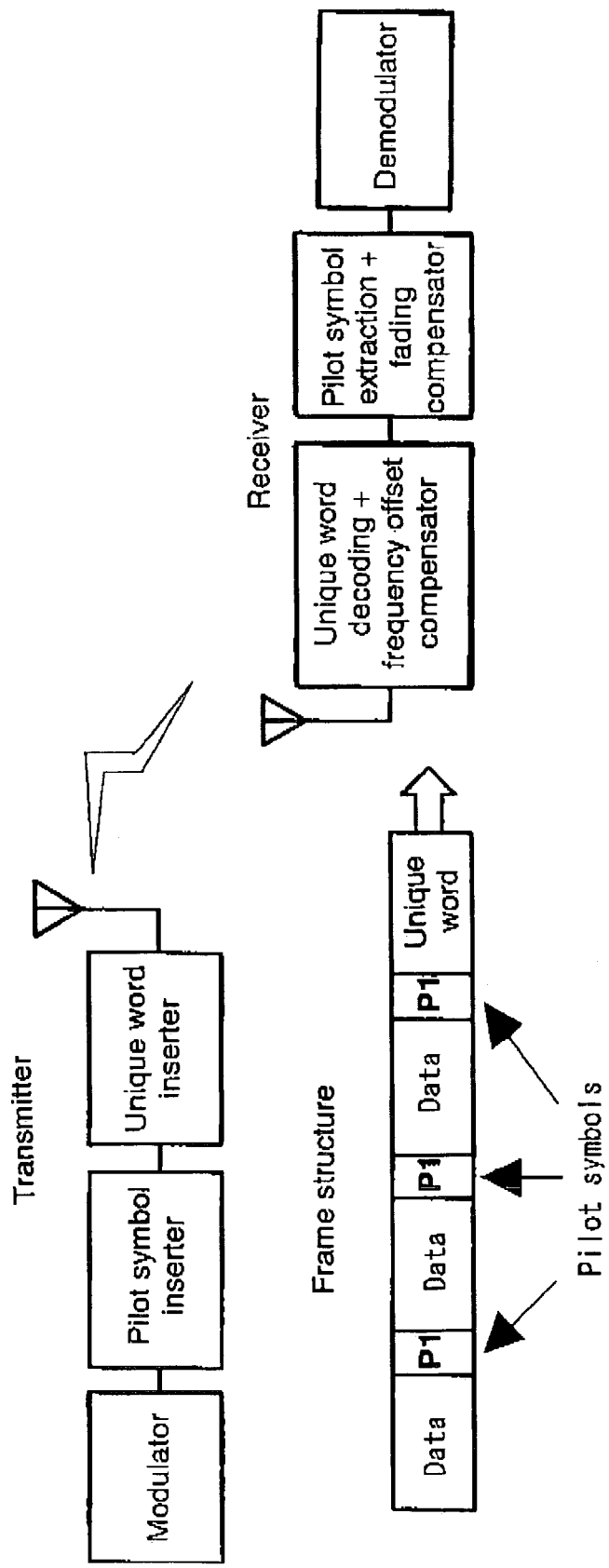
FIG. 1 is a diagram showing the first related art.
Figure 2:
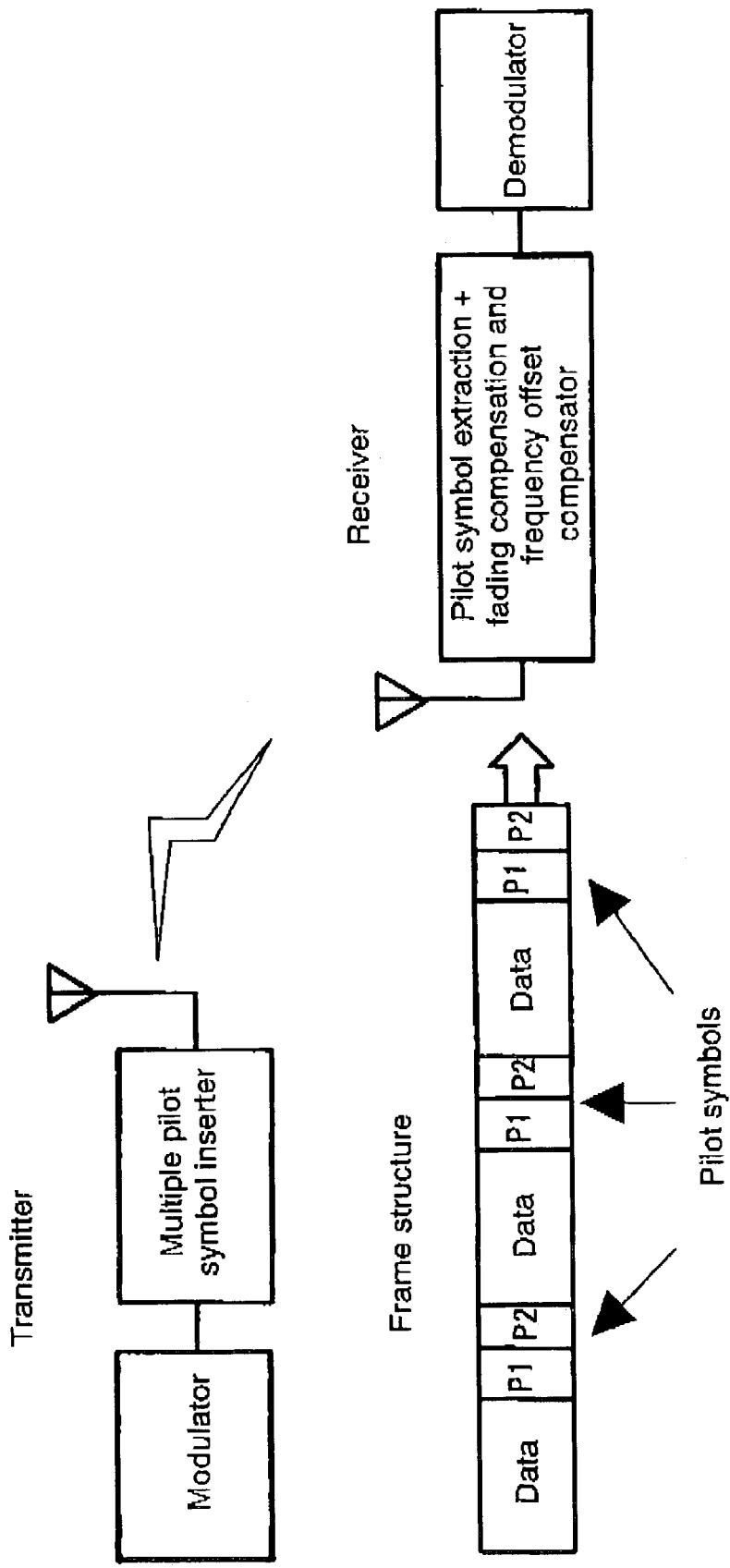
FIG. 2 is a diagram showing an example of the second related art.
Figure 3:
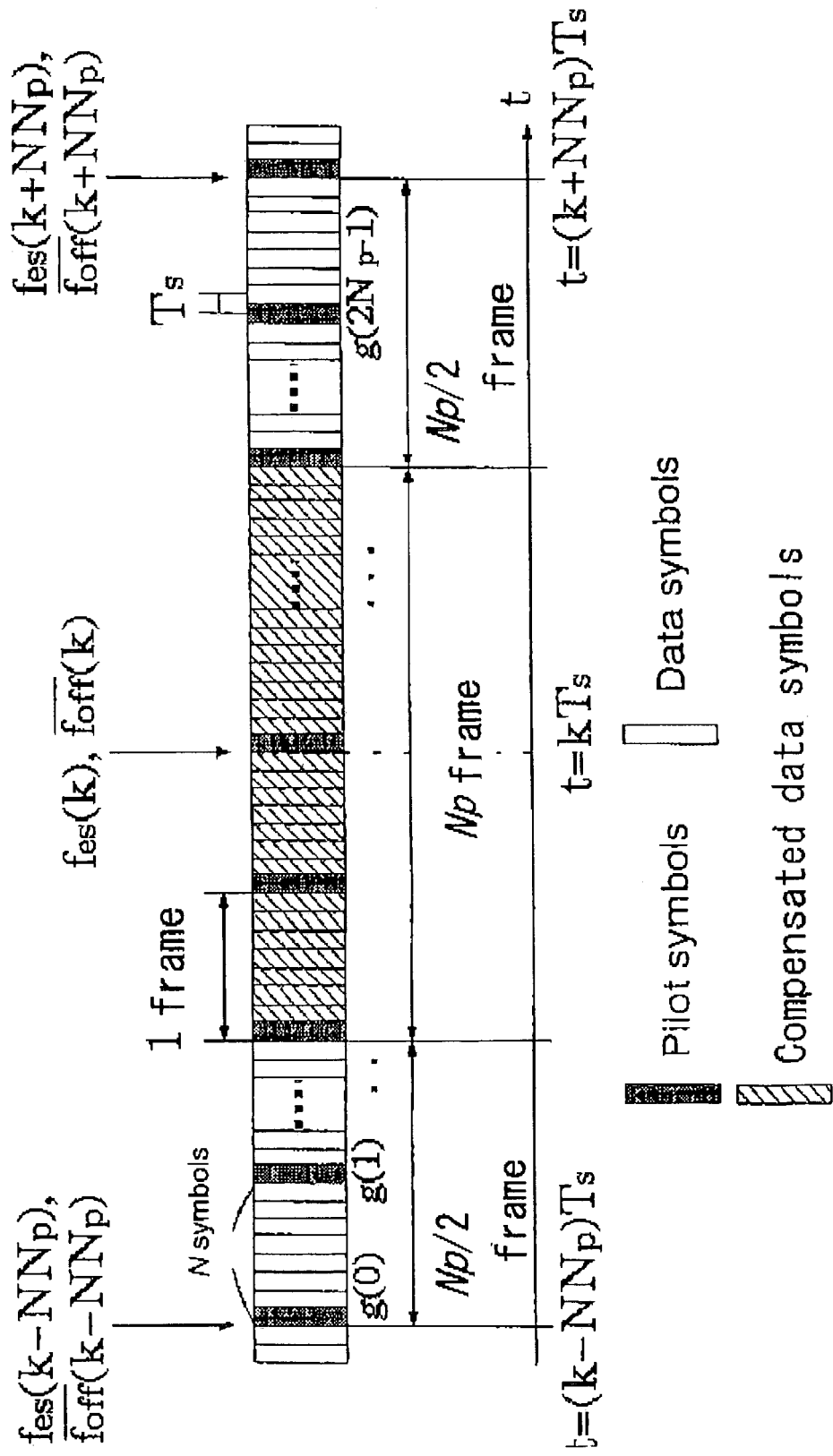
FIG. 3 is a diagram showing the frame structure.

Here follows a detailed description of the preferred embodiments of the present invention. First for explanation, FIG. 3 shows the frame structure. In FIG. 3, $T_S$ is the symbol interval, k is the number of frames and $t=kT_S$. As shown in the figure, taking N to be the number of symbols in one frame, a known pilot symbol is inserted at the start of the frame. Thus, the data transmission rate decreases $(N-1)/N$ times. In the receiver, if the frame and symbol synchronization are preserved, the communications path fluctuation $g(l)$ is obtained as follows:

$$g(l) = \frac{r(l)}{z_p} \quad (l = 0, 1, \ldots, 2N_p - 1) \tag{1}$$

where r(l) is the signals received at the pilot symbol, $z_p$ is the known pilot symbol vector component. The known symbol $z_p$ allocated to the pilot symbol is arbitrary, but placing it on the outermost point of the mapped signal constellation has the best received signal-to-noise ratio (SNR) and improves the estimation accuracy in propagation path distortion and is thus preferable. Using g(l) from equation (1), the communications path fluctuation of the central $N_p$ frames, namely the fading and frequency offset are estimated and compensated from the received pilot symbol at the $2N_p$ points in FIG. 3. Note that the functions $f_{es}()$ and $\overline{f_{off}}()$ in FIG. 3 are to be described later.

Figure 4:
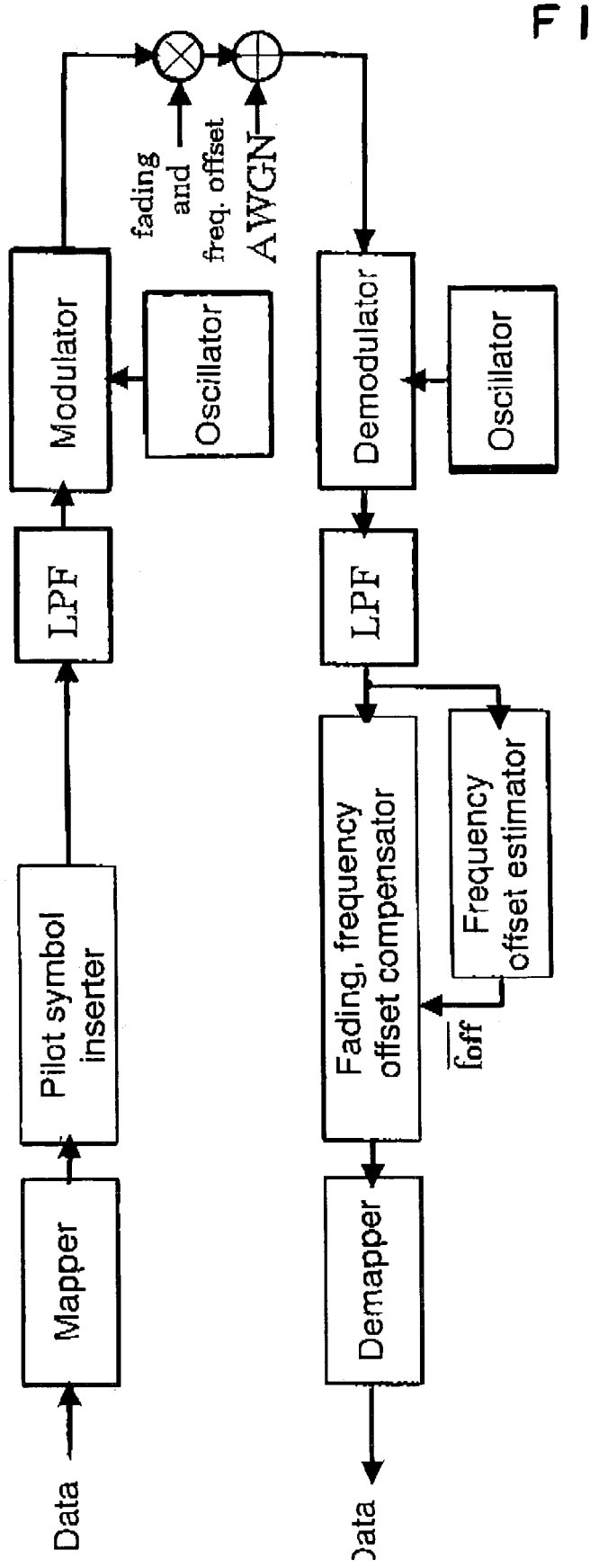
FIG. 4 is a block diagram of the constitution of an open-loop system that compensates for frequency offset.

Next, FIG. 4 is a system block diagram of the constitution of an open-loop system that compensates for frequency offset. In the transmitter, the data to be sent are first mapped and pilot symbols axe inserted. After the frame shown in FIG. 3 is composed, the signals are filtered through a low-pass filter (LPF), modulated and sent. In FIG. 4, the low-pass filters (LPFs) in both the transmitter and receiver are cosine root roll-off filters. On the propagation path, the signals are distorted by fading, the frequency offset generated by the station motion and additive white Gaussian noise (AWGN). Note that the frequency offset generated by the error of quasi-synchronous detection in the receiver is included in this distortion due to the propagation path.

In the receiver, the transmitted signals are received. The received symbols are demodulated in an open-loop system structure. After demodulation, the signals pass through the LPF and are supplied to a simple frequency offset estimator, where spectrum analysis is performed and an approximate frequency offset is estimated from the received spectrum. At the same time, the received pilot signals are extracted, the spectrum of the extracted pilot signals is found and the fading components and estimated frequency offset values are found from this spectrum. From these values, the propagation path distortion is estimated and removed. Finally, demapping and decoding are carried out. Since the fading and frequency offset are compensated for at the same time from the received pilot symbols in this manner, a relatively simple frame structure and system structure is achieved.

In the system shown in FIG. 4, the fading estimator and compensator to be described later also simultaneously estimates the frequency offset over a certain range, so the simple frequency offset estimator does not need to be very accurate. For this reason, a simple method that is little affected by the modulation scheme is adopted.

FIG. 5 shows a block diagram of an estimator that outputs the location of the rough central frequency of the received signal. As illustrated in FIG. 3, because the compensation is carried out per $N_p$ frames, the estimated value of the frequency offset is calculated every $N_p$ frames. First, received wave r(r) is oversampled as $C_s$ times $1/T_S$, and then $r(k_1)$ is obtained where $$t = k_1 \frac{T_s}{C_s}. \quad (2)$$

Then, $f_{es}(k)$ is derived from $r(k_1)$ of $2NN_pC_s$ points where $C_s[k-NN_p] \leq k_1 \leq C_s[k+NN_p]-1$. Using fast Fourier transform (FFT), the signal spectrum is calculated as follows:

$$R(n) = F[r(k_1)] \text{ for } n=0, 1, \ldots, 2C_sNN_p-1 \quad (3)$$

and $f_{es}(k)$ is set as the median of spectrum R(n). If we assume that R(n) is the probability density, the median for n becomes $$E\{n\} = \frac{\sum_{n=0}^{2C_sNN_p-1} \frac{n-C_s}{2T_sNN_p}|R(n)|}{\sum_{n=0}^{2C_sNN_p-1} |R(n)|}. \quad (4)$$

Then, $f_{es}(k)$ is obtained as $$f_{es}(k) = \begin{cases} 2E\{n\} & \text{for open-loop} \\ E\{n\} & \text{for closed-loop} \end{cases}. \quad (5)$$

Figure 6:
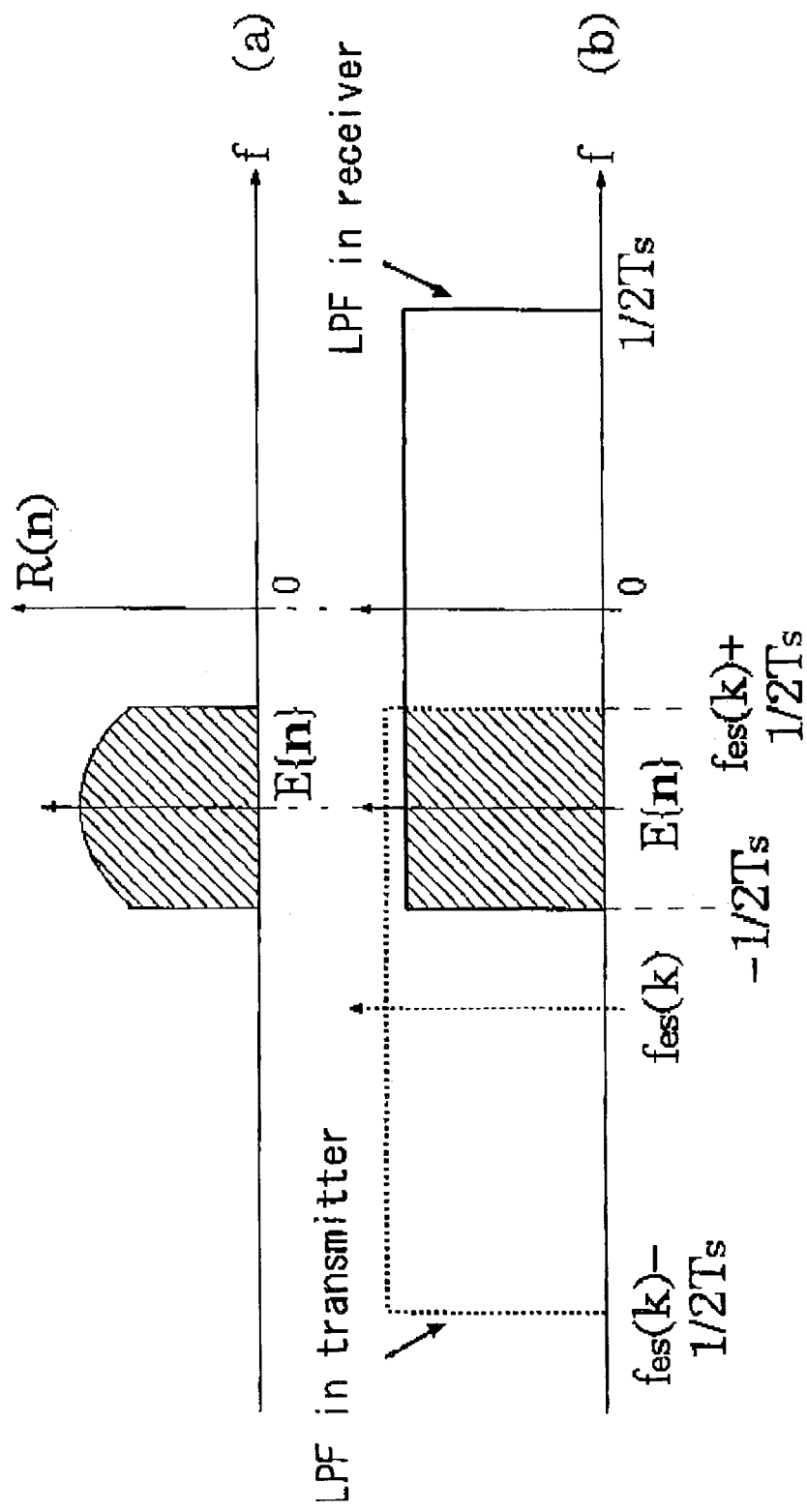
FIG. 6 is a diagram of the relationship between $E\{n\}$ and $f_{es}(k)$ in an open-loop system.

Next, FIG. 6 with frequency on the vertical axis and the spectral intensity on the horizontal axis shows the basis of the open-loop of equation (6). In FIG. 6, for simplicity the LPFs are shown as rectangles where the roll-off factor is 0. In addition, the frequency bandwidth of the LPFs is ½ $T_S$, or the smallest width at which the symbol width $T_S$ signal can pass. In an open-loop scheme as shown in FIG. 4, frequency offset estimation is performed after the LPF stage. If the spectral intensity of the received signal is R(n) as shown in FIG. 6(a), that is, the received signal is estimated to be a result of both ends of a spectrum being cut by the LPFs, then $f_{es}(k)$ of the actual frequency offset in FIG. 6 is obtained by $$E\{n\} = \frac{1}{2}\left[\frac{-1}{2T_s} + \left\{f_{es}(k) + \frac{1}{2T_s}\right\}\right] \quad (6)$$

which is equal to equation (5). In a closed-loop scheme, a wide-bandwidth filter is used on the receiver-side LPF of the estimator as described later, so there is no need for this correction. The possible range of estimation of $f_{es}(k)$ is as shown in FIG. 6 for the open-loop scheme, but for the closed-loop from the sampling theorem this becomes:

$$-\frac{1}{T_s} \leq f_{es}(k) \leq \frac{1}{T_s} \quad (7)$$
$$\frac{-C_s}{2T_s} \leq f_{es}(k) \leq \frac{C_s}{2T_s}.$$

However, $f_{es}(k)$ naturally has some estimation error caused by the noise included in $r(k_1)$ and if the noise power is high then the noise level of R(n) is high, $|f_{es}(k)|$ becomes low, which may decrease the accuracy of estimation. Moreover, $f_{es}(k)$ is affected by factors of noise form and spectral form and it sways. To avoid this, averaging is used with past values as follows:

$$\overline{f_{off}}(k) = \frac{1}{K_f} \sum_{i=-K_f+1}^{0} f_{es}(k+iNN_p) \quad (8)$$

where $K_f$ is the number of points used for the averaging. This $f_{off}(k)$ is used as the estimated frequency offset. The calculation time of functions $f_{es}(\,)$ and $\overline{f_{off}}(\,)$ is shown in FIG. 3. However, past values were not presented in the initial estimation of $\overline{f_{off}}(k)$, the first $f_{es}(k)$ is used as all past values of $f_{es}(\,)$. As a result, $$\overline{f_{off}}(k) = f_{es}(k) \quad (9)$$

is given at the beginning of $\overline{f_{off}}$ estimation. This estimator calculates only the center frequency of the received spectrum, so the basis of calculation is simple. However, the estimation accuracy is not very high and if there is an interference signal within the calculation band, the accuracy may seriously degrade. Thus, in the following, no interference is assumed to be within the bandwidth. As a tradeoff for accuracy, this scheme is extremely general. To wit, it is independent of the modulation scheme (e.g., amplitude modulation, frequency modulation, phase modulation or polarization modulation in which the direction of polarization is modulated) and no extra reference symbols such as carrier waves or preambles are needed, so high transmission efficiency can be achieved. As will be shown in later examples, this estimator is sufficient for the proposed system to enable precise compensation. Therefore this simple frequency offset estimator was used.

Although $\overline{f_{off}}$ is calculated every $N_p$ frames in FIG. 3, it can be estimated only once, at the beginning, and then fix the initial value as $\overline{f_{off}}(k)$ when the actual frequency offset is static.

Figure 7:
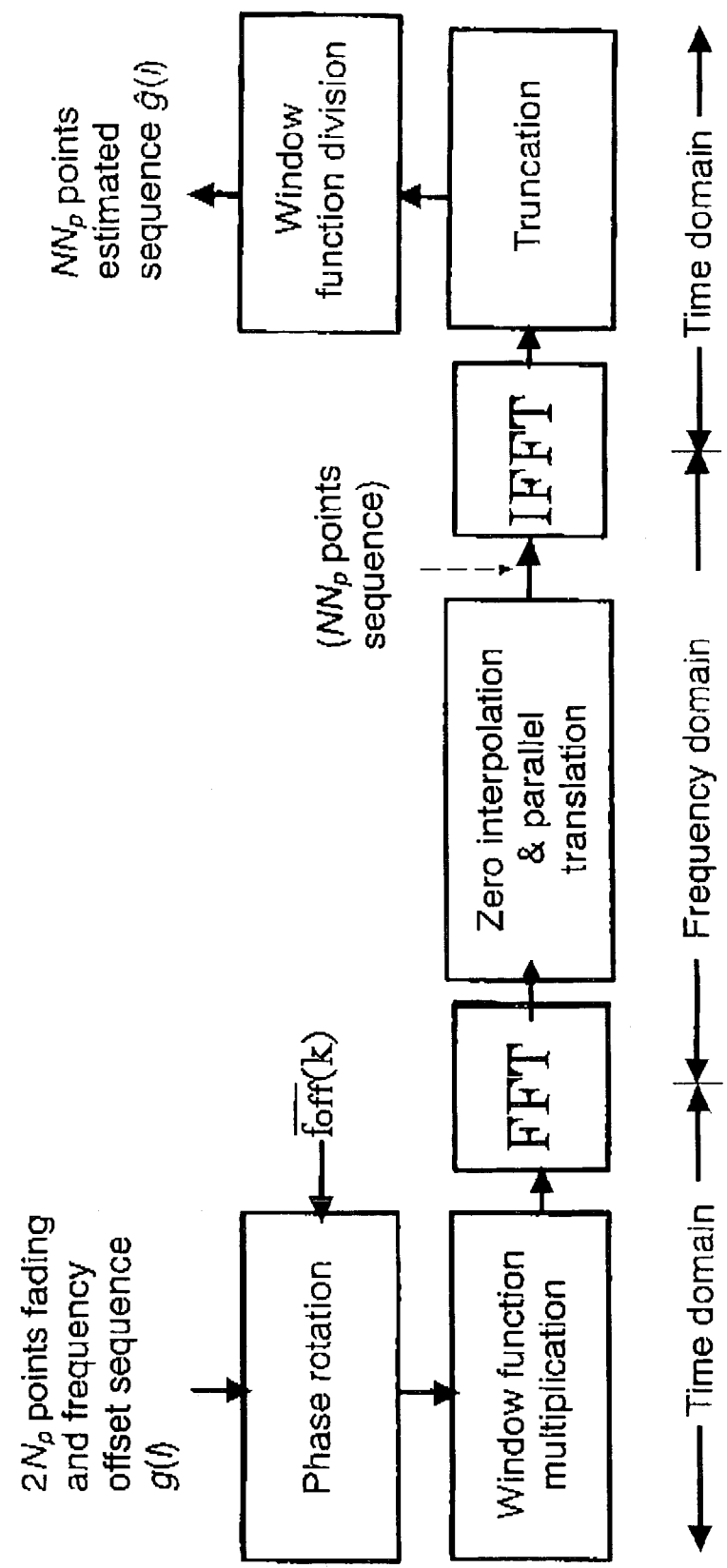
FIG. 7 is a diagram showing the fading and frequency offset estimation block.

Here follows a description of the fading and frequency offset estimator. FIG. 7 is a block diagram of the fading and frequency offset estimator. The FFT and the inverse fast Fourier transform (IFFT) are used in the estimation. As described in FIG. 3, the fading and frequency-offset sequence of $NN_p$ points are estimated from the received pilot symbols of $2N_p$ points. However, the FFT with $2N_p$ points has a narrow frequency range of $$\frac{-1}{2NT_s} \le f \le \frac{1}{2NT_s}, \quad (10)$$

because the $2N_p$ points given in equation (1) is a sparse sequence, so distortion can only be estimated within this frequency range. Therefore, to compensate for a frequency which is outside in equation (10), $\overline{f_{off}}(k)$ is used and the spectrum of g(l) is shifted to fall into equation (11) by canceling the frequency-offset components as follows.

$$g_0(l) = g(l)\exp(-j2\pi\overline{f_{off}}(k)lT_S) \text{ for } n=0, 1, \ldots, 2N_p-1 \quad (1)$$

Next, the Hanning window function is multiplied. Since the FFT and the IFFT are used in the calculation, using the Hanning window function is effective for spectrum concentration. By using this function, the alias effect, that is, the spectrum power outside the calculated band, is reduced and the fading can be estimated more accurately. The $g_0(l)$ thus obtained is multiplied by the Hanning window function as follows;

$$g_0(l) = g_0(l)w_l \text{ for } n=0, 1, \ldots, 2N_p-1 \quad (12)$$

where $w_l$ is the Hanning window function:

$$w_l = \frac{1}{2}\left[1 - \cos\left(\frac{\pi l}{N_p}\right)\right]. \quad (13)$$

Then $g_1(l)$ is transformed into the frequency domain by using FFT:

$$G_1(n) = \sum_{l=0}^{2N_p-1} g_1(l)\exp\left(-\frac{j\pi nl}{N_p}\right) \text{ for } n = 0, 1, \ldots, 2N_p-1 \quad (14)$$

Note that although this formula is merely a discrete Fourier transform (DFT), the FFT is applied in practice to shorten the calculation time. For the g(l) which has the frame structure of FIG. 3, from the sampling theorem, taking $f_D$ Hz to be the maximum Doppler frequency of fading, if $$f_D T_S \le \frac{1}{2N} \quad (15)$$

then logically the original fading series can be completely restored. Within this range, $G_1(n)$ has all the components of the received fading symbols, and near $n=N_p$, this becomes $G_1(n)=0$. Thus, zero interpolation is carried out as follows to obtain the $2NN_p$ point series:

$$G_2(m) = \quad (16)$$

$$\begin{cases} NG_1(m); & \text{for } 0 \le m \le N_p - 1 \\ 0; & \text{for } N_p \le m \le N_p(2N-1) - 1 \\ NG_1(m - 2N_p\{N-1\}); & \text{for } N_p(2N-1) \le m \le 2N_pN - 1 \end{cases}$$

where $G_2(m)$ has the following periodicity:

$$G_2(m+2NN_p r) = G_2(m) \text{ for } r=0, \pm 1, \pm 2, \ldots \quad (17)$$

This zero interpolation in the frequency domain is the same as the interpolation between pilot symbols in the time domain. This scheme is must simpler than that of interpolating in the time domain because only zero insertion is required. The spectrum center frequency in equation 11 was shifted from $\overline{f_{off}}(k)$ to 0, so this must be returned to its original state with respect to $G_2(m)$. $G_2(m)$ is a series in the frequency domain so the operation is as follows:

$$G_2(m) = G_2[m - 2NN_p\overline{f_{off}}(k)T_s] \quad (18)$$

The time domain sequence is obtained by transforming $G_3(m)$ using the IFFT:

$$G_3(i) = \sum_{m=0}^{2NN_p-1} G_3(m)\exp\left(\frac{j\pi mi}{NN_p}\right) \text{ for } n = 0, 1, \ldots, 2NN_p - 1. \quad (19)$$

Even though equation (19) is only an inverse discrete Fourier transform (IDFT), the IFFT is used in the actual calculation. Moreover, only the central $NN_p$ symbols ($NN_p/2 \le i \le 3NN_p/2-1$) of calculated $g_3(i)$ are picked up. The alias effect is usually more severe at the ends of the calculated span, so the end points are truncated in spite of the waste of calculation time.

Finally, the estimated fading and frequency offset sequence after dividing the components of the window function is obtained as follows:

$$\hat{g}(i) = \frac{g_3(i + NN_p - k)}{w'_{(i+NN_p-k)}} \text{ for } i = k - \frac{NN_p}{2}, \quad (20)$$

$$k - \frac{NN_p}{2} + 1, \ldots, k - \frac{NN_p}{2} - 1$$

where $\hat{g}(i)$ is the estimated fading sequence, which contains the carrier frequency offset, and $w'_x$ is the same fanning function as in equation 13 except for the number of points:

$$w'_x = \frac{1}{2}\left[1 - \cos\left(\frac{\pi x}{NN_p}\right)\right] \text{ for } x = \frac{NN_p}{2}, \frac{NN_p}{2} + 1, \ldots, \frac{3NN_p}{2} - 1 \quad (21)$$

Since both the FFT and IFFT are used in the calculation, N and $N_p$ are set to be the power of 2.

The fading and frequency offset are compensated for simultaneously by removing $\hat{g}(k)$ as follows:

$$\hat{r}(k) = \frac{r(k)}{\hat{g}(k)}. \quad (22)$$

The open-loop scheme of FIG. 4 has a relatively simple structure, but the range of compensation of the frequency offset is limited by the receiving LPF. Thus, after delaying the $\overline{f_{off}}$ estimated as in FIG. 8, a closed-loop system is constituted by using a voltage-controlled oscillator (VCO) that outputs the signal serving as the base frequency to provide feedback to the modulator. However, the frequency change in the VCO is phase-continuous, so clock synchronization and frame synchronization on the receiving side are to be preserved. In this system, the LPF on the receiving side is divided into two, and the one used for communication is a root-Nyquist filter as in the open-loop system, but for the stage before the estimator, utilizing the fact that the simple frequency offset estimator simply finds the spectrum center, a Gaussian filter is used. Thereby, $\overline{f_{off}}$ estimation over a wide range is possible.

Figure 9:
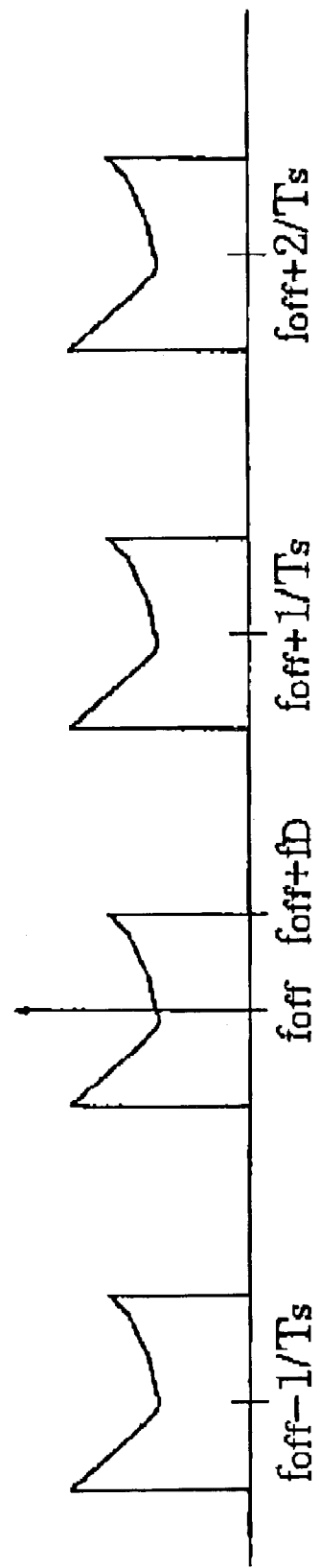
FIG. 9 is a diagram showing the spectrum of the frequency domain for transmitted frames.

On the receiving side, demodulation is first performed and then the $f_{off}(k)$ is estimated by the simple frequency offset estimator through the Gaussian filter LPF2. The $\overline{f_{off}}(k)$ obtained here is compensated for by the fading and frequency off-set compensation block and at the same time it is provided as input to VCO after a delay of $N_p$ frames and the base frequency of demodulation is changed. Thereby, if $\overline{f_{off}}(k)$ is correct, then the value of $\overline{f_{off}}(k+NNp)$ estimated in the simple frequency offset estimator becomes small, so even if the reception SNR is poor, the estimation error of $\overline{f_{off}}$ goes in the direction of converging to zero. Moreover, while the estimated range of the frequency offset has limits due to the Gaussian filter in an instantaneous estimated range, by providing feedback, the LPF restrictions do not apply to the entire system so wide-range following becomes possible. As the number of times of estimation with $\overline{f_{off}}(k)$ advances, $$\overline{f_{off}}(k) \to f_{es}(k) + \frac{m}{T_s} \text{ for } m = 0, \pm 1, \pm 2, \ldots \quad (23)$$

thus moving toward convergence, and when m≠0, error with respect the true $\overline{f_{off}}$ does occur, but compensation for the frequency offset is performed correctly. The reason for this is that the frequency domain spectrum due to the FFT of the received frames of FIG. 3 becomes as shown in FIG. 9, but it is sufficient to satisfy equation 23 even if $\overline{f_{off}}(k)$ is not necessarily a true value, so it is sufficient to increase or decrease by integral multiple of the inverse of the transmission symbol interval time ($T_S$). This phenomenon is easily understood when considering the frequency domain and operation can also be performed easily, so it has advantages when compensating for the frequency offset in the frequency domain.

Then, with the closed-loop method also, the $\overline{f_{off}}(k)$ thus obtained is used to perform compensation in the fading and frequency offset compensation block and obtain demodulated data. In FIG. 7, in order to prevent deterioration due to the alias effect, of the $2NN_p$ points of estimated results, only half or $NN_p$ points are adopted as estimated values. However, in order to reduce the amount of computation, it is preferable to use many points as estimated values while suppressing deterioration due to the alias effect.

Figure 11:
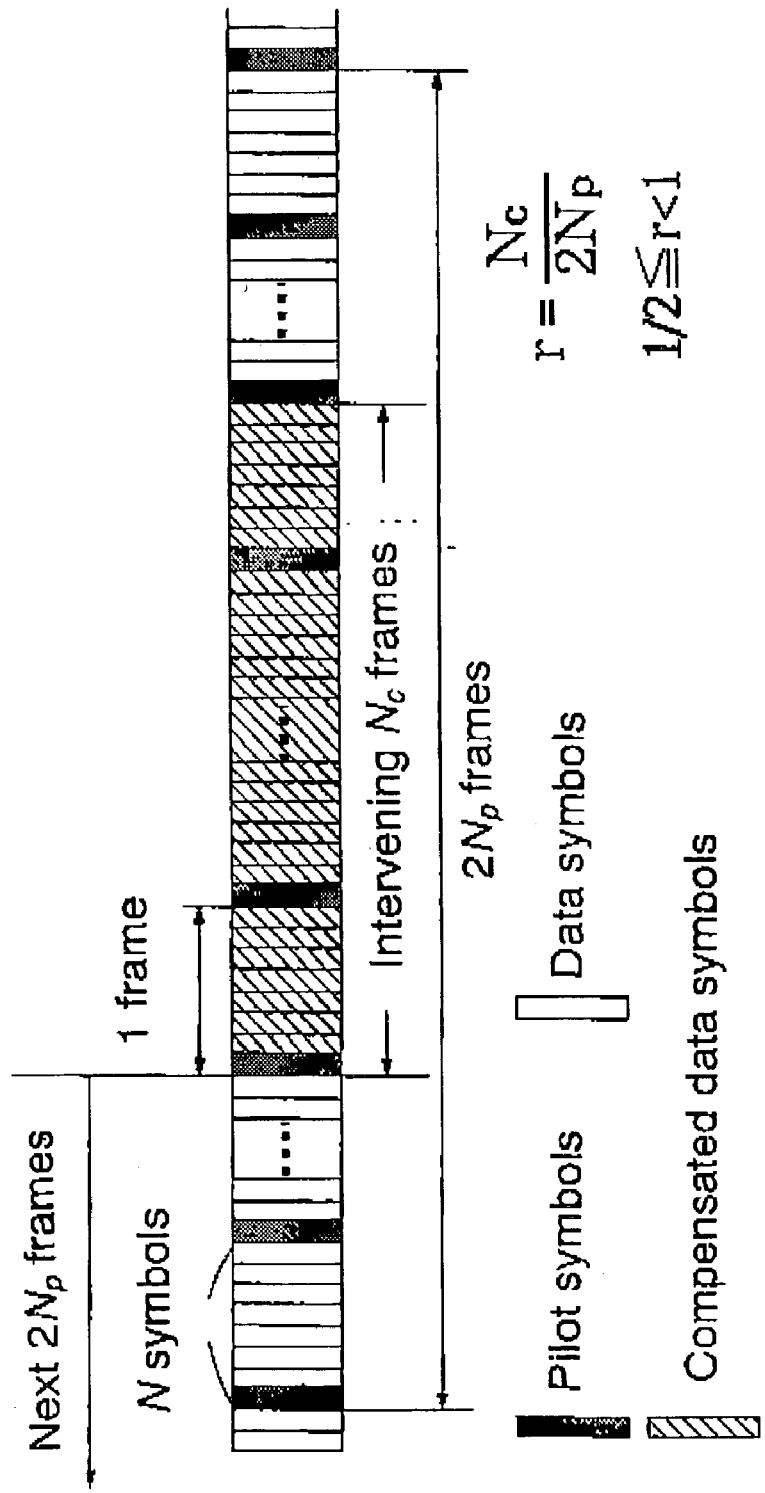
FIG. 11 is a diagram showing the frame structure wherein the ratio of the estimation and compensation block is r.

The speed of fading and deterioration due to the alias effect were studied in FIG. 11 of Reference Document 1 (E. Okamoto et al., "Rayleigh fading compensation for 16QAM using FFT," IEEE Trans. Veh. Technol., vol. 48, pp. 1626-1633, September 1999), and the faster the fading the wider the bandwidth of the fading spectrum of equation 16 becomes, so the alias effect becomes large, and thus the deterioration in the estimation near both ends of the $2N_p$ frame of FIG. 3 becomes large.

Figure 10:
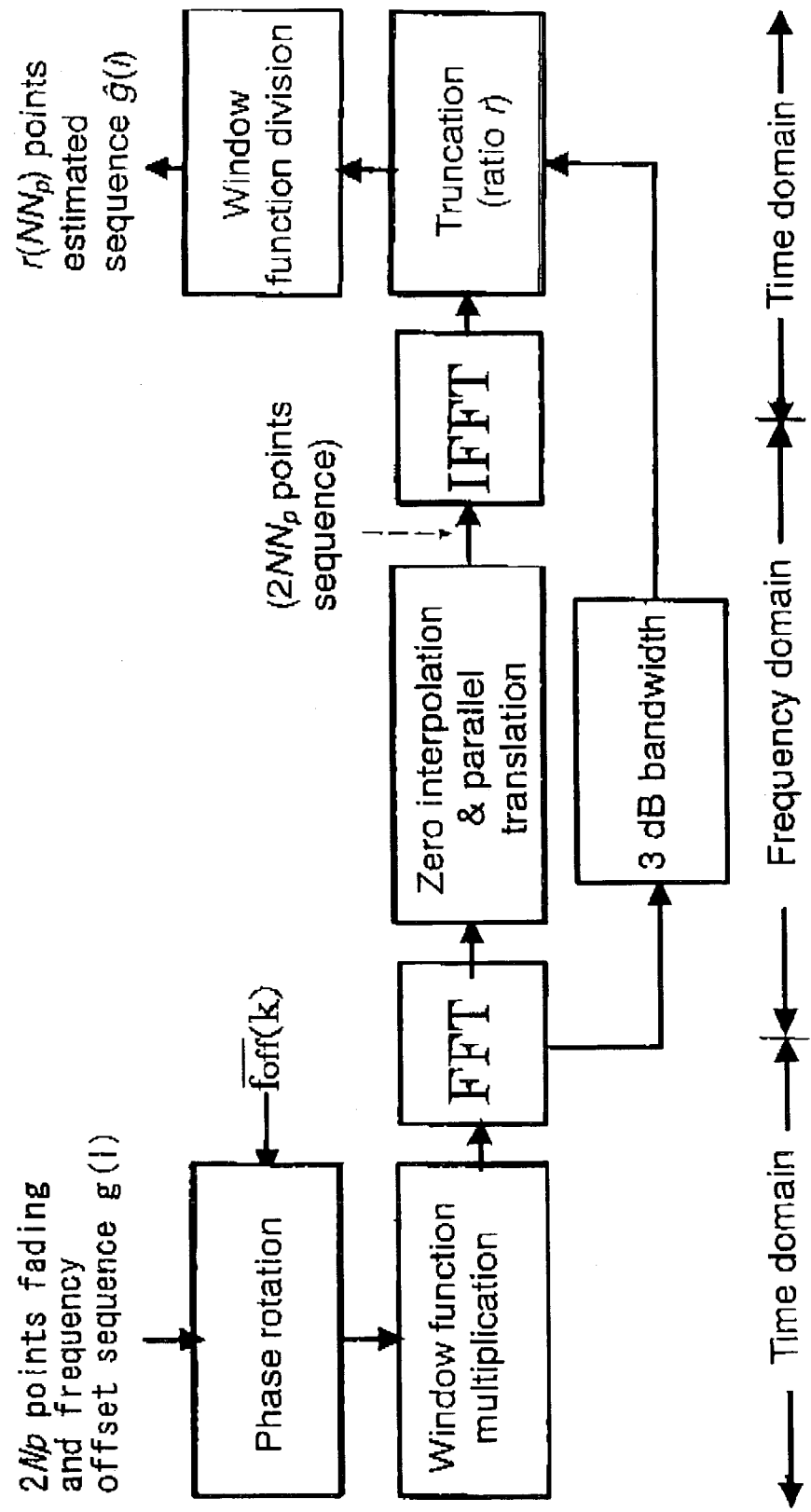
FIG. 10 is a diagram showing the variable estimation interval ratio scheme intended to reduce the amount of computation.

However, when the fading is slow, the alias effect becomes smaller, so within the $2NN_p$ points, the range that can be used as estimated values is enlarged. To that end, consider that the bandwidth of the fading series of $2N_p$ points in the pilot symbol points is evaluated as in FIG. 10, and thus changed into a series of r ($\frac{1}{2} \leq r \leq 1$) that are used to perform estimation and compensation as in FIG. 11 based thereupon. To wit, when the evaluated fading bandwidth is small, r is made larger and when the bandwidth is wide, it is made smaller down to $r=\frac{1}{2}$. For example, it is sufficient to make the product of the fading bandwidth and r constant. Thereby, it is possible to reduce the amount of computation while preserving high estimation accuracy.

In addition, while this may slightly sacrifice estimation accuracy, the number of points used at the time of evaluation of the bandwidth of the fading series can be made less than $2N_p$, and in an extreme case, it may be preferable to adjust the value of r depending on the value of fading. Thereby, it is possible to reduce the amount of computation even further Preferred Embodiment 1

Figure 8:
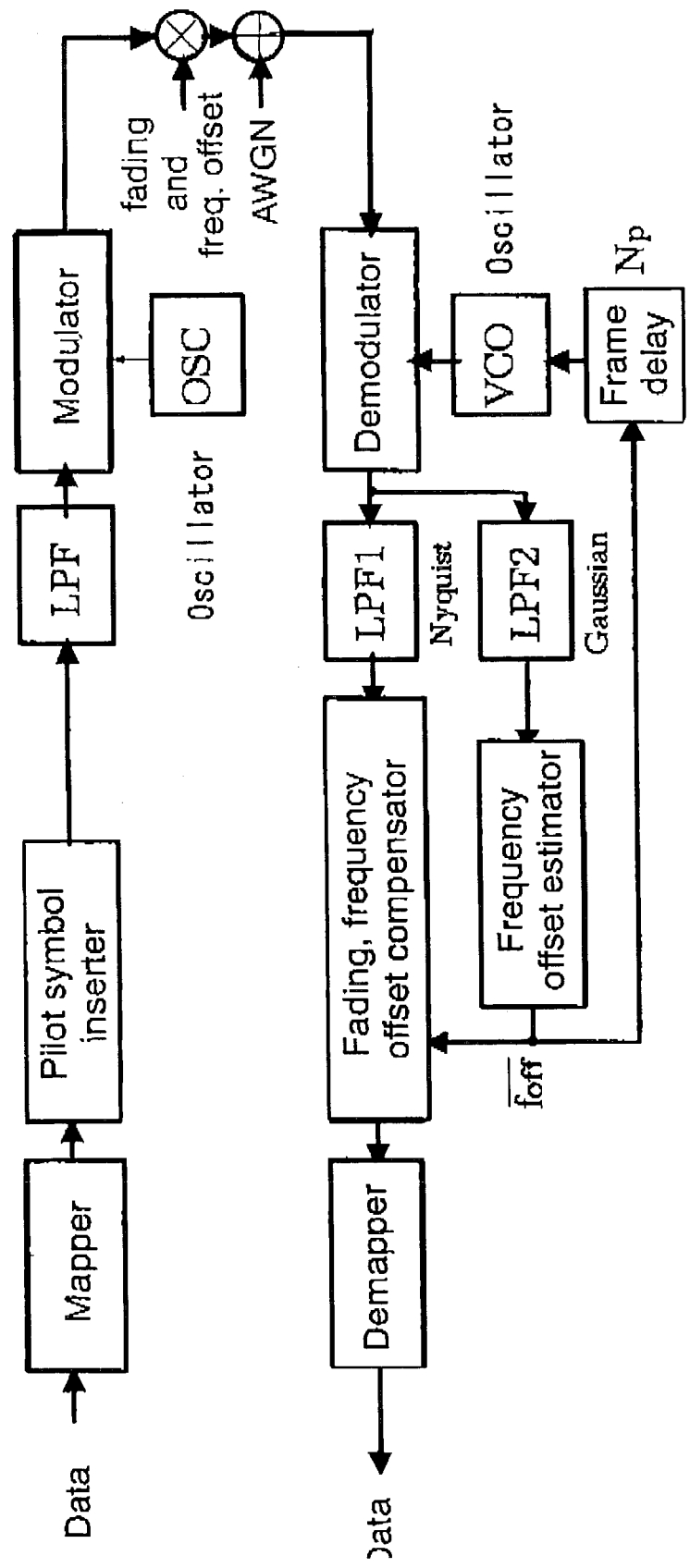
FIG. 8 is a block diagram of the constitution of a system adopting the closed-loop configuration.

In order to demonstrate the effects of the present invention, as Preferred Embodiment 1, computer simulations of the transmission systems shown in FIGS. 4 and 8 were performed and the response was measured. Table 1 shows the simulation parameters. The modulation method was uncoded and Gray-mapped 16QAM, and the transmission rate ($=1/T_S$) was 1.6 Mbps. In the following, it was assumed that there was perfect clock and frame synchronization. In the bit-error-rate (BER) calculation, to avoid the degradation caused by the initial $\overline{f_{off}}(k)$ error in equation (10), the calculation was started at 48 frames.

TABLE 1

| Simulation parameters | |
|---|---|
| Modulation | Uncoded 16QAM |
| Mapping | Gray |
| Fading | Flat Rayleigh |
| Low-pass filter | Square root raised cosine ρ = 0.5 |
| Gaussian filter | $BT_s$ = 4.0 |
| Transmission rate | 1.6 Msymbols/s |
| N | 16 |
| $N_p$ | 16 |
| $C_s$ | 4 |
| $K_f$ | 16 |

Figure 12:
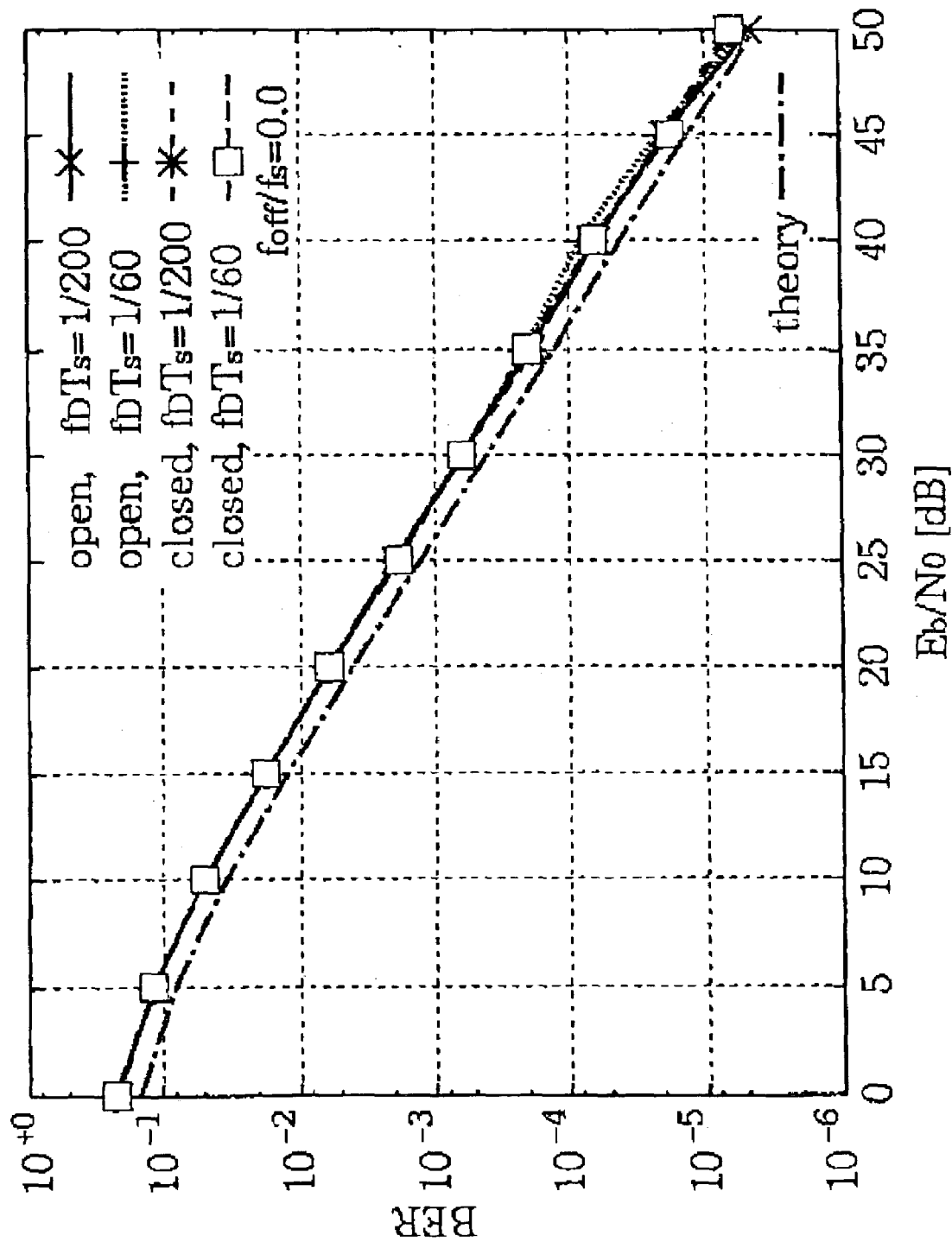
FIG. 12 is a graph of the BER versus $E_b/N_0$ in the case of no frequency offset ($f_{off}/f_s=0$).
Figure 13:
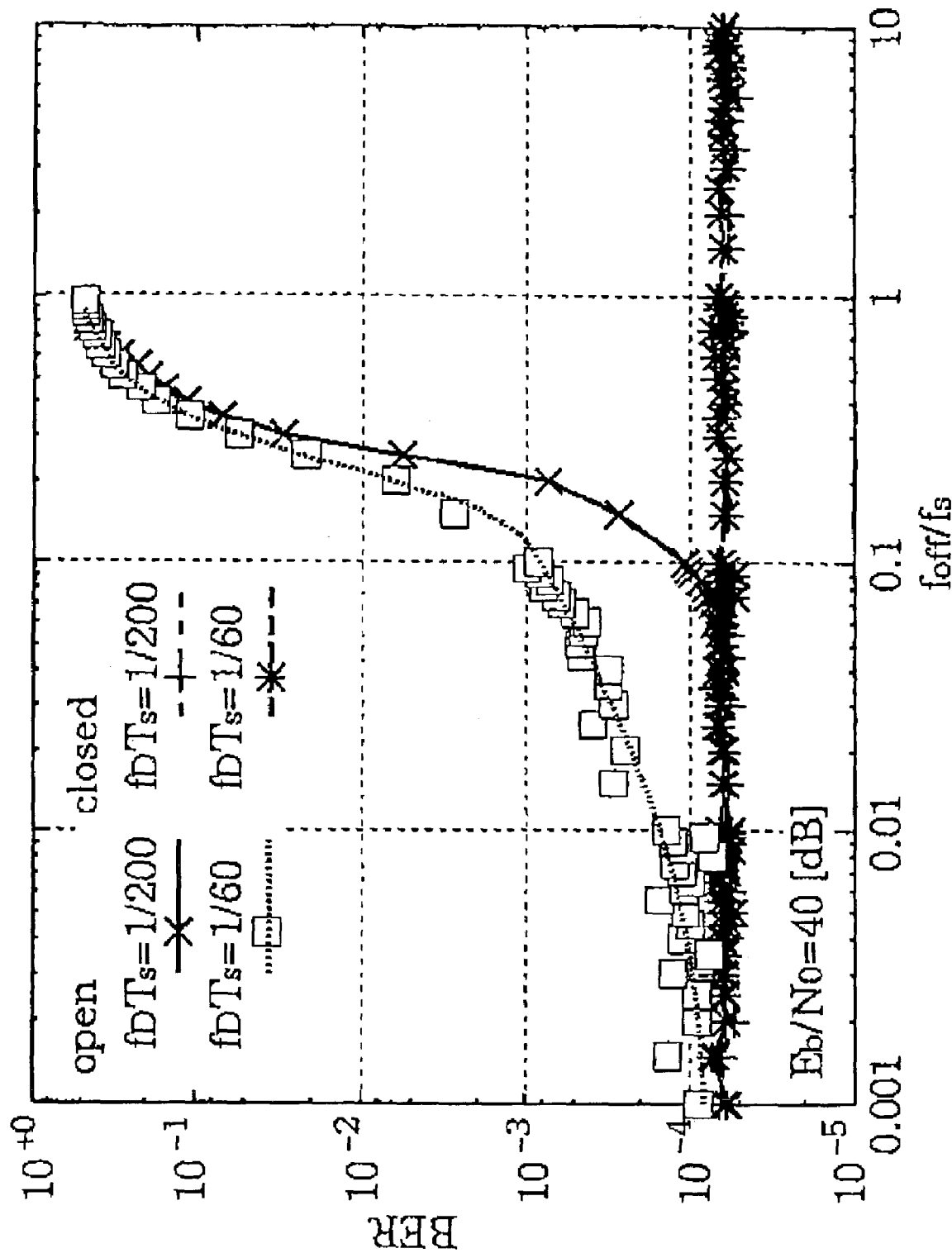
FIG. 13 is a graph of the BER versus $E_b/N_0$ in the case of a frequency offset ($f_{off}/f_s=0.12$).

In Preferred Embodiment 1, the performance was calculated under the fixed frequency-offset conditions, that is, $f_{off}(t)$=const. FIGS. 12 and 13 show the BER performance for this technique with and without a frequency offset. Note that the parameter $f_s=1/T_S$ is the normalized frequency. In the case of no frequency offset from FIG. 12, one can see that there is no error floor and the distortion is well-compensated for when there is no frequency offset, in both the open- and closed-loop schemes. According to Reference Document 1, the degradation from the theoretical curve was approximately 2.2 dB when N=16, and the results of calculation show that this was to approximately 2.2-2.4 dB at BER=10$^5$, showing a nearly theoretical compensation accuracy. From FIG. 13, when the normalized error frequency offset is $f_{off}/f_S$=0.12, the BER deteriorated due to the damping effect of the receiving LPF in the open-loop scheme, but in the closed scheme, it was nearly the same as in the case of no frequency offset, thus exhibiting high compensation performance.

Figure 14:
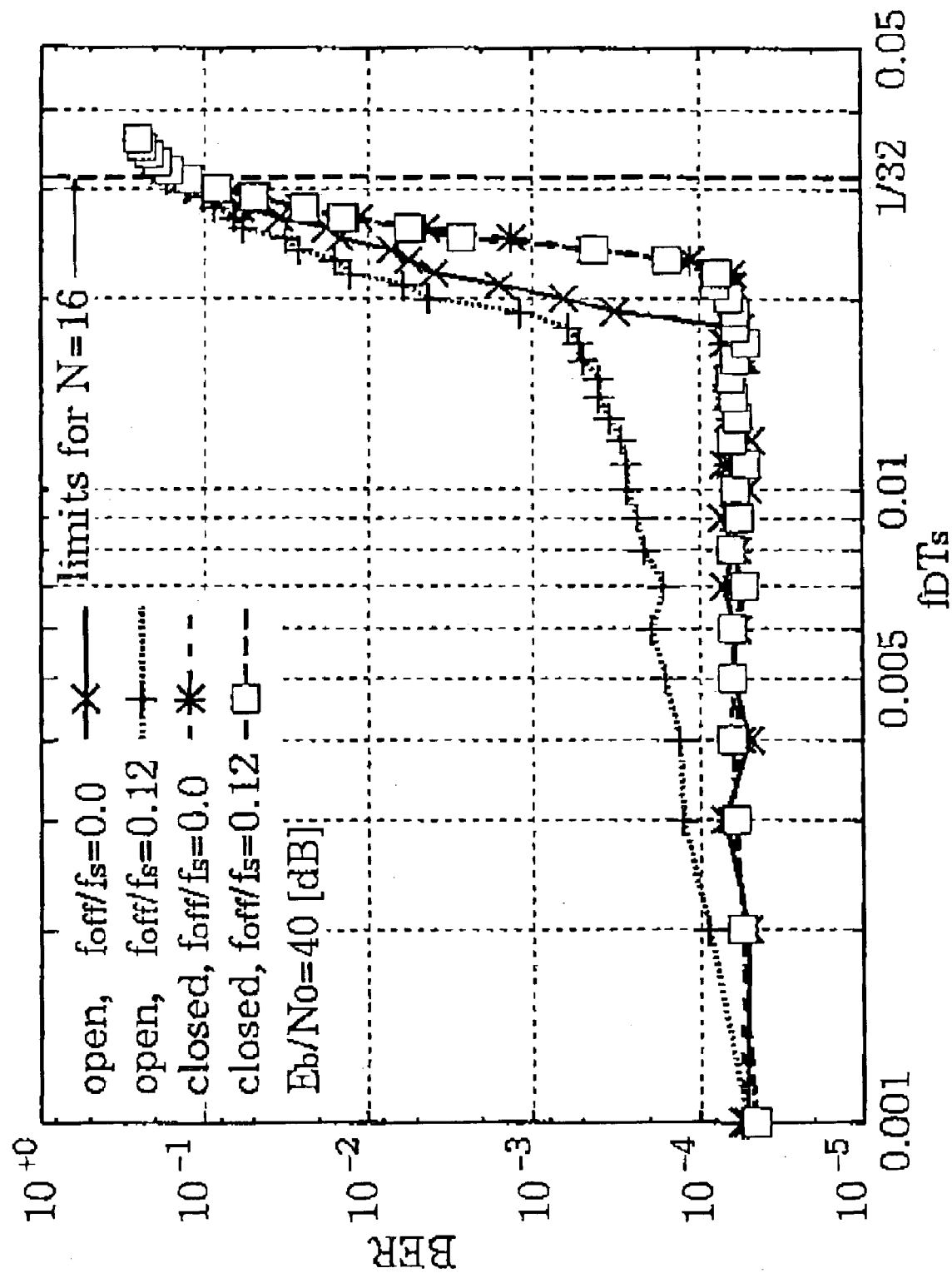
FIG. 14 is a graph of the BER versus the normalized fading pitch $f_D T_s$ where $E_b/N_0=40$ dB.

Next the BER versus the normalized fading pitch $f_D T_s$ was calculated when $E_b/N_0$=40 dB. The results are in FIG. 14. The theoretical range is obtained from equation (15). While the performance deteriorates gradually when a frequency offset is present in the open-loop scheme, when no frequency offset is present, high compensation accuracy is maintained up to near $f_D T_s$=1/32. In the closed-loop scheme, one can see that compensation is performed with good accuracy independent of the frequency offset.

Figure 15:
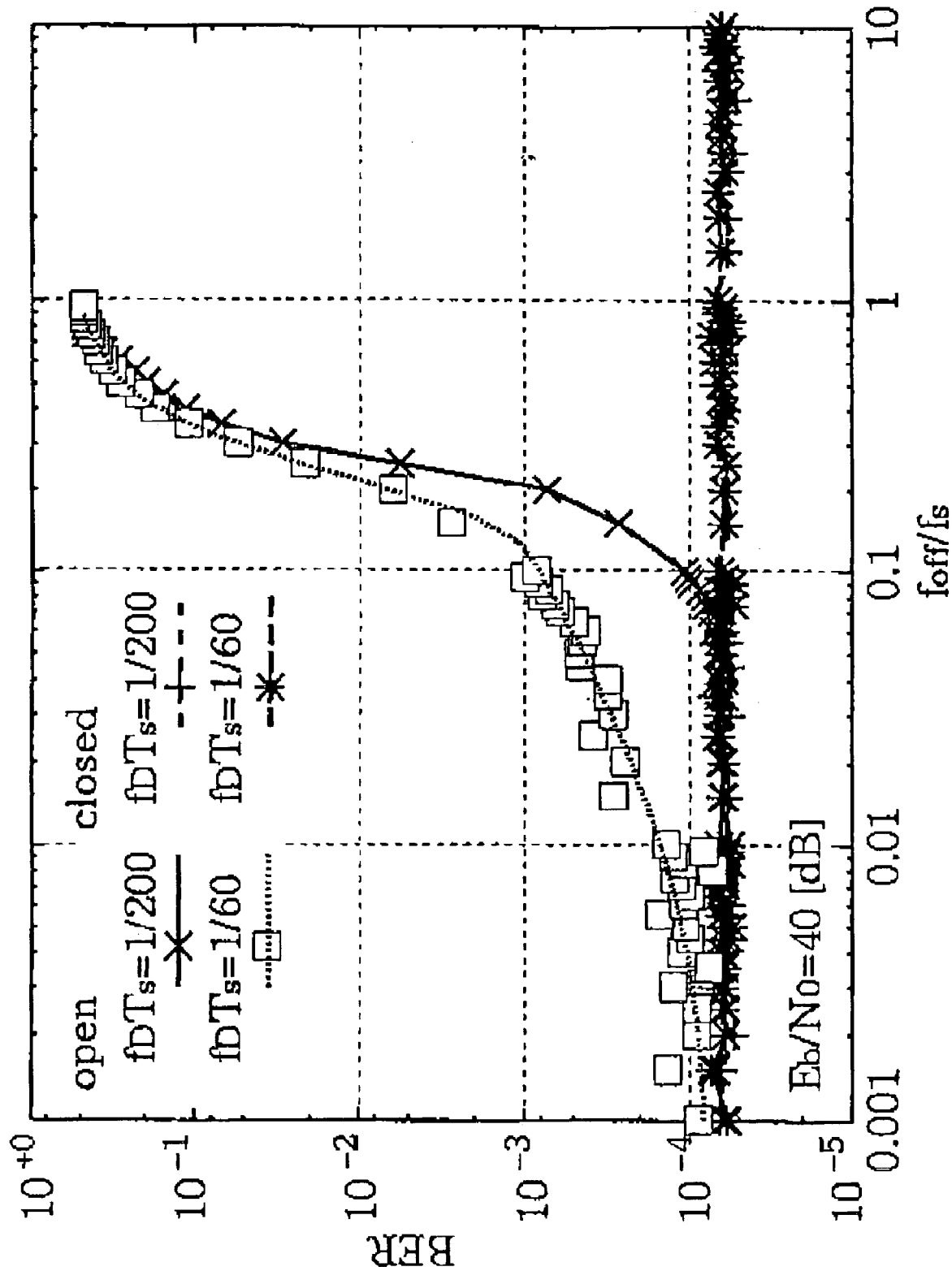
FIG. 15 is a graph of the BER versus the normalized frequency offset $f_{off}/f_s$ where $E_b/N_0=40$ dB.

FIG. 15 shows the DEB versus frequency offset $\overline{f_{off}}/f_s$ where $E_b/N_0$=40 dB. With the open-loop scheme, as the frequency offset becomes larger, it suffers signal distortion due to the LPF so the performance degrades gradually. In addition, when fading is fast, the bandwidth of the propagation path distortion series g(l) becomes wider, so it is more sensitive to distortion due to the LPF and the deterioration of the performance with respect to the frequency offset is hastened. However, when fading is slow, good performance is shown down to the domain in which the normalized frequency offset is 0.07 or less. Also, in the closed-loop scheme, feedback is applied to the base frequency of the modulator, so compensation is performed with good accuracy regardless of the magnitude of the frequency offset. For example, when a system has the parameter of 1.6 Mbps of Table 1 and a radiofrequency (RF) carrier at 10 GHz, the mobile station with a frequency offset of $f_{off}/f_S$=0.1 has a moving velocity of 1.7×10$^4$ km/h, so one can see that this is a sufficiently fast speed for current mobile communications systems.

Preferred Embodiment 2:

Next, the performance of this method in an environment in which $f_{off}$ changes was calculated by the following equations:

$$f_{off}(k) = f_0 + \alpha k \text{ [linear]} \quad (24)$$

$$f_{off}(k) = f_0 + \frac{\alpha}{T_s} \sin(w T_s k) \text{[sinusoidal]} \quad (25)$$

The frequency offset changes when the station changes its direction, velocity or acceleration. The above equations simulate the simplest examples of these, where equation (24) is an example in which the frequency offset changes linearly and equation (25) is an example in which it changes sinusoidally. Regarding the acceleration of $f_{off}$ ($f_{off}''$), while the former is 0 the latter is not 0. Note that in the following, it is assumed that $\alpha$=2.0 in equation (24) and $\alpha$=0.2 and w=10 in equation (25), and the BER was calculated within the range of $|f_{off}(k)/f_S| \leq 0.05$ to avoid the degradation caused by the LPF and to evaluate the pure following performance of the method only for the frequency offset changes.

Figure 16:
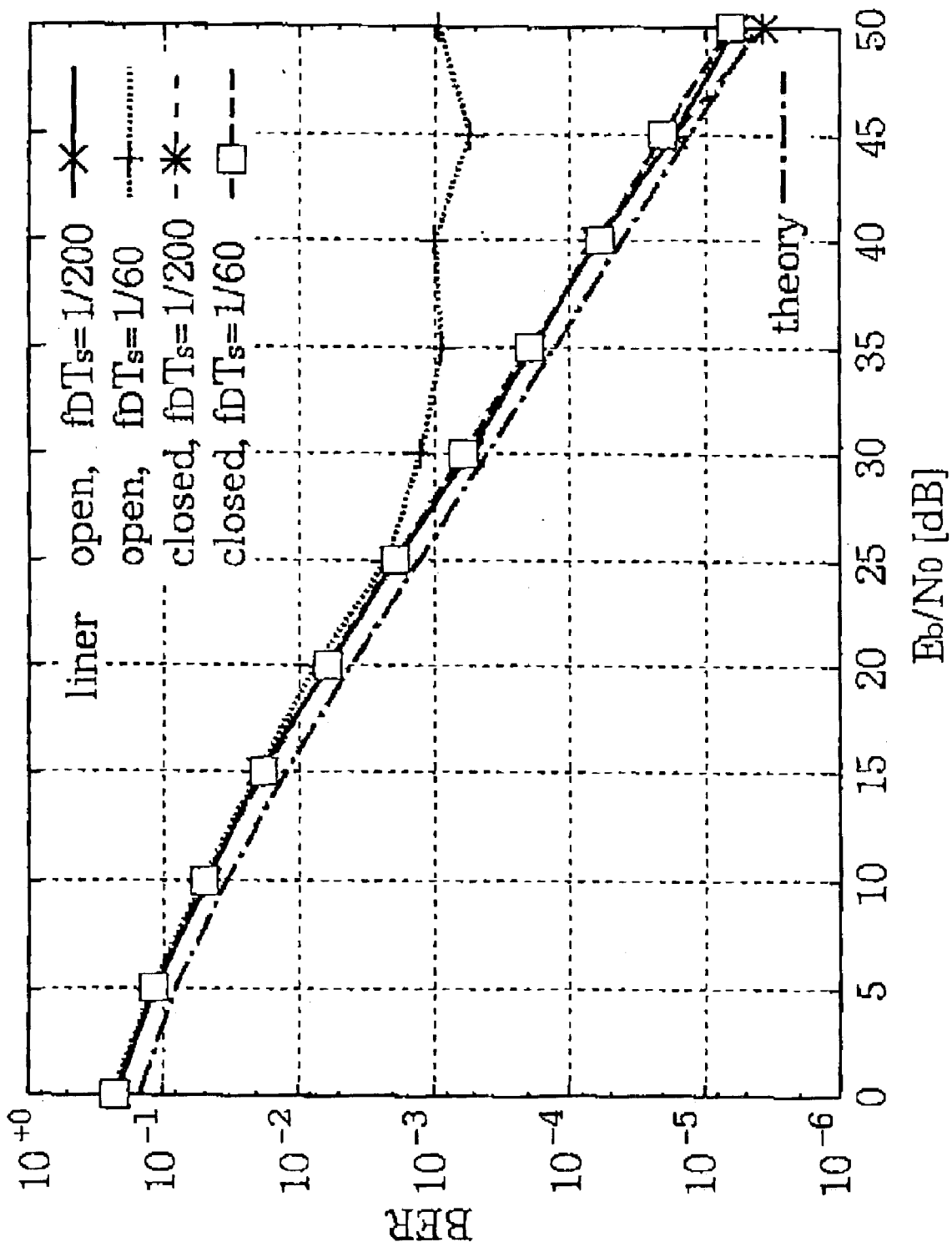
FIG. 16 is a graph of the BER versus $E_b/N_0$ in the case of that the frequency offset changes linearly.
Figure 17:
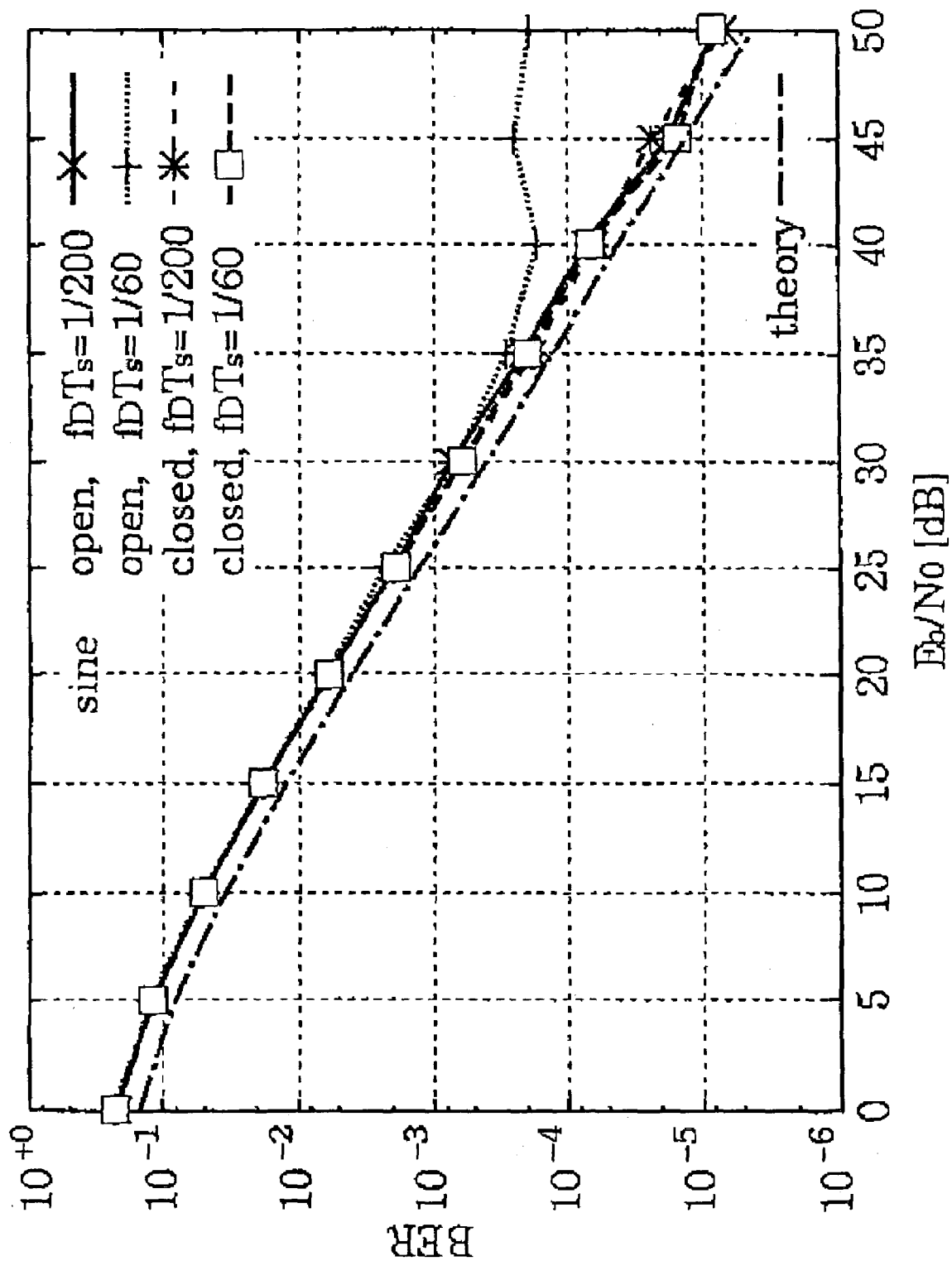
FIG. 17 is a graph of the BER versus $E_b/N_0$ in the case of that the frequency offset changes sinusoidally.

FIGS. 16 and 17 show the BER versus the $E_b/N_0$. As is evident from the figure, in the same manner as in FIGS. 12 and 13, in the open-loop scheme, there were error floors when fading was fast, but otherwise high compensation performance is demonstrated. Thus, this method was demonstrated to be able to follow even a changing frequency offset.

Figure 18:
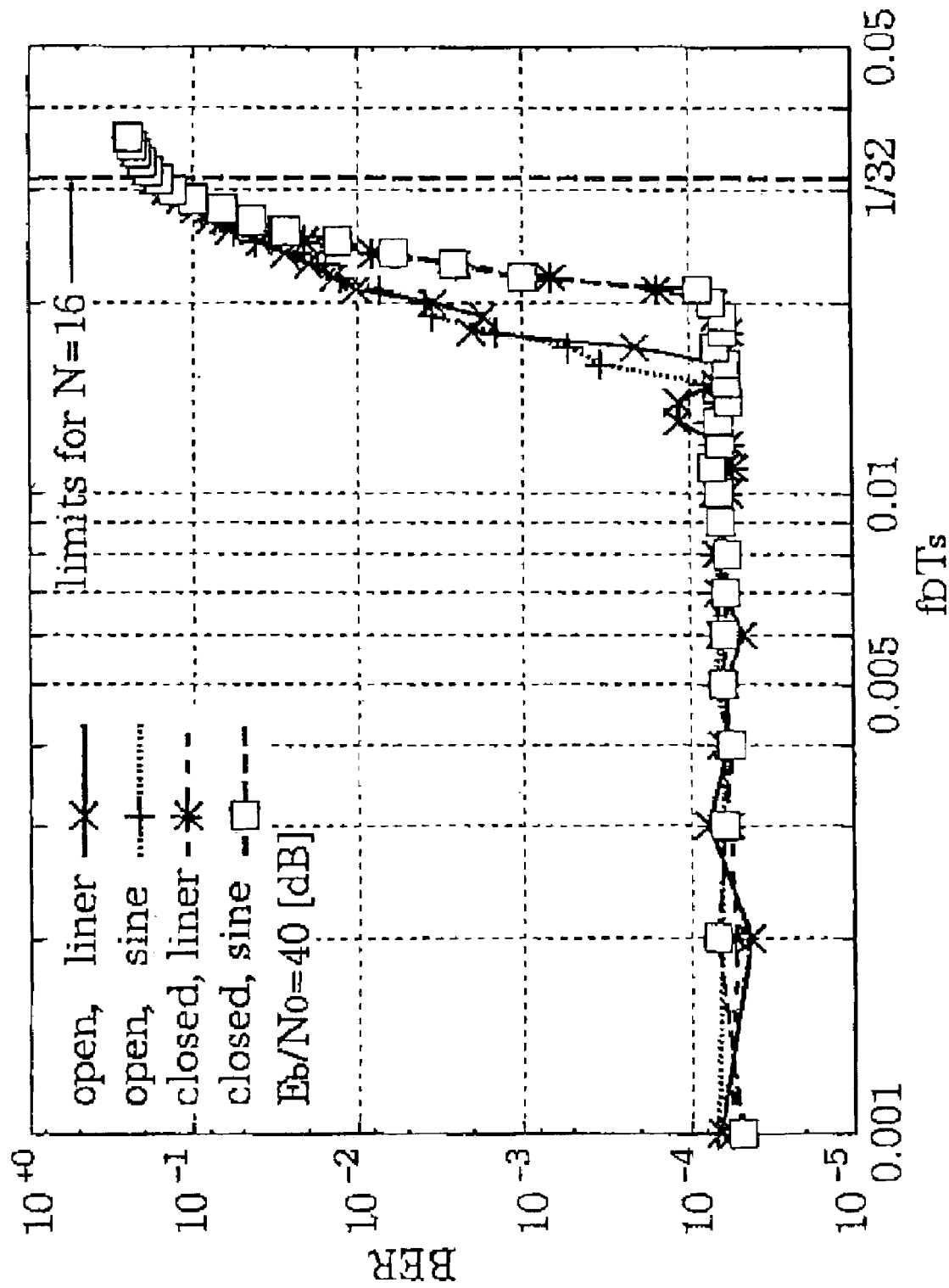
FIG. 18 is a graph of the BER versus the normalized fading pitch $f_D T_s$ in changing frequency-offset environments.

FIG. 18 shows the BER versus the normalized fading pitch $f_D T_s$ when $E_b/N_0$=40 dB. In the same manner as FIG. 14, one can see that compensation is performed with high accuracy up until near the theoretical limit.

Next is a study of the performance versus the instantaneous rate of change $|f_{off}'(t)|$ of the frequency offset. The normalized sate of change of the frequency offset with respect to equations (24) and (25) become:

$$f_{off}'(k) = \begin{cases} \alpha; & \text{for the linear function} \\ \alpha w(\max); & \text{for the sinusoidal function} \end{cases} \quad (26)$$

Figure 19:
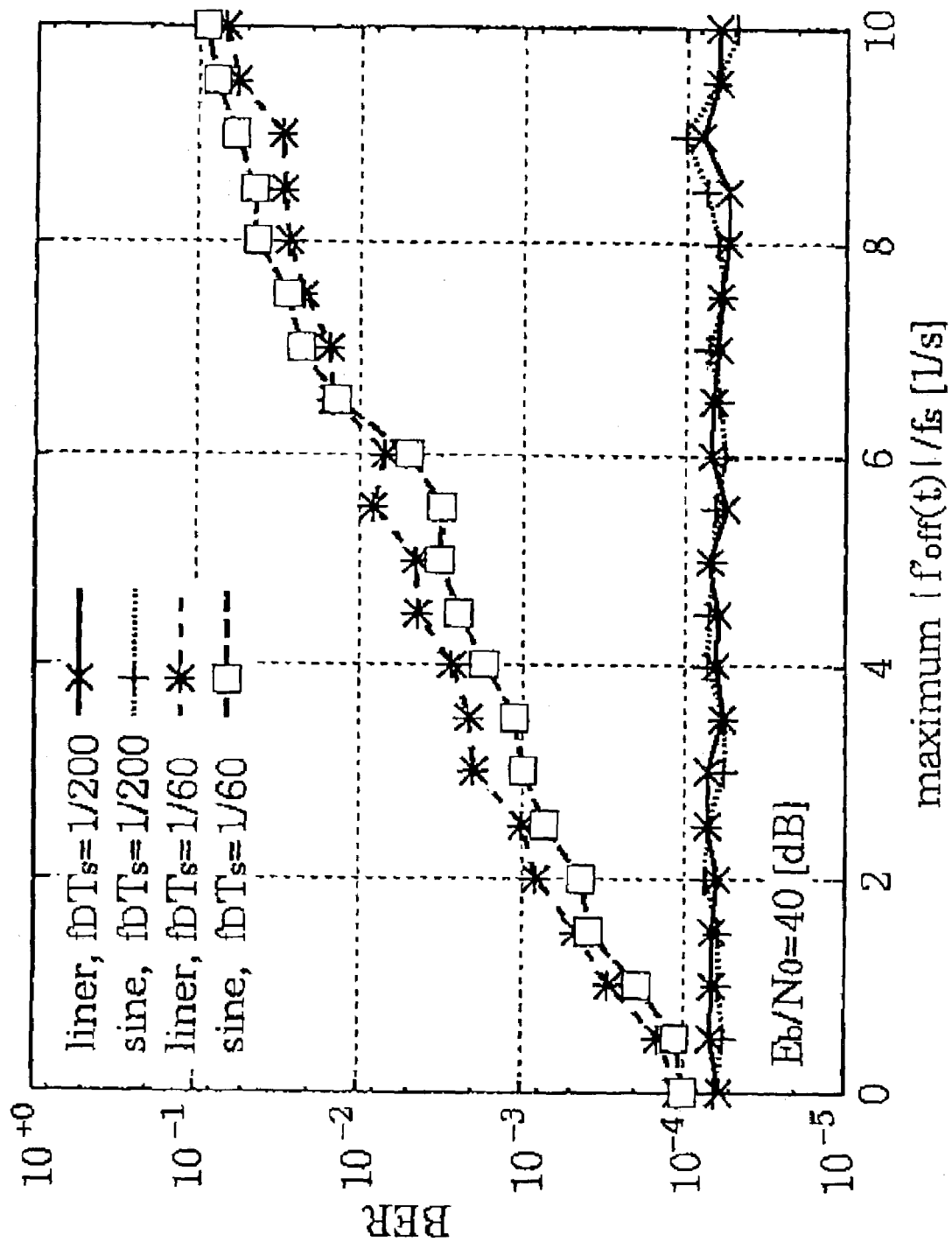
FIG. 19 is a graph of the open-loop BER versus the rate of change of the normalized frequency offset $f_{off}/f_s$.
Figure 20:
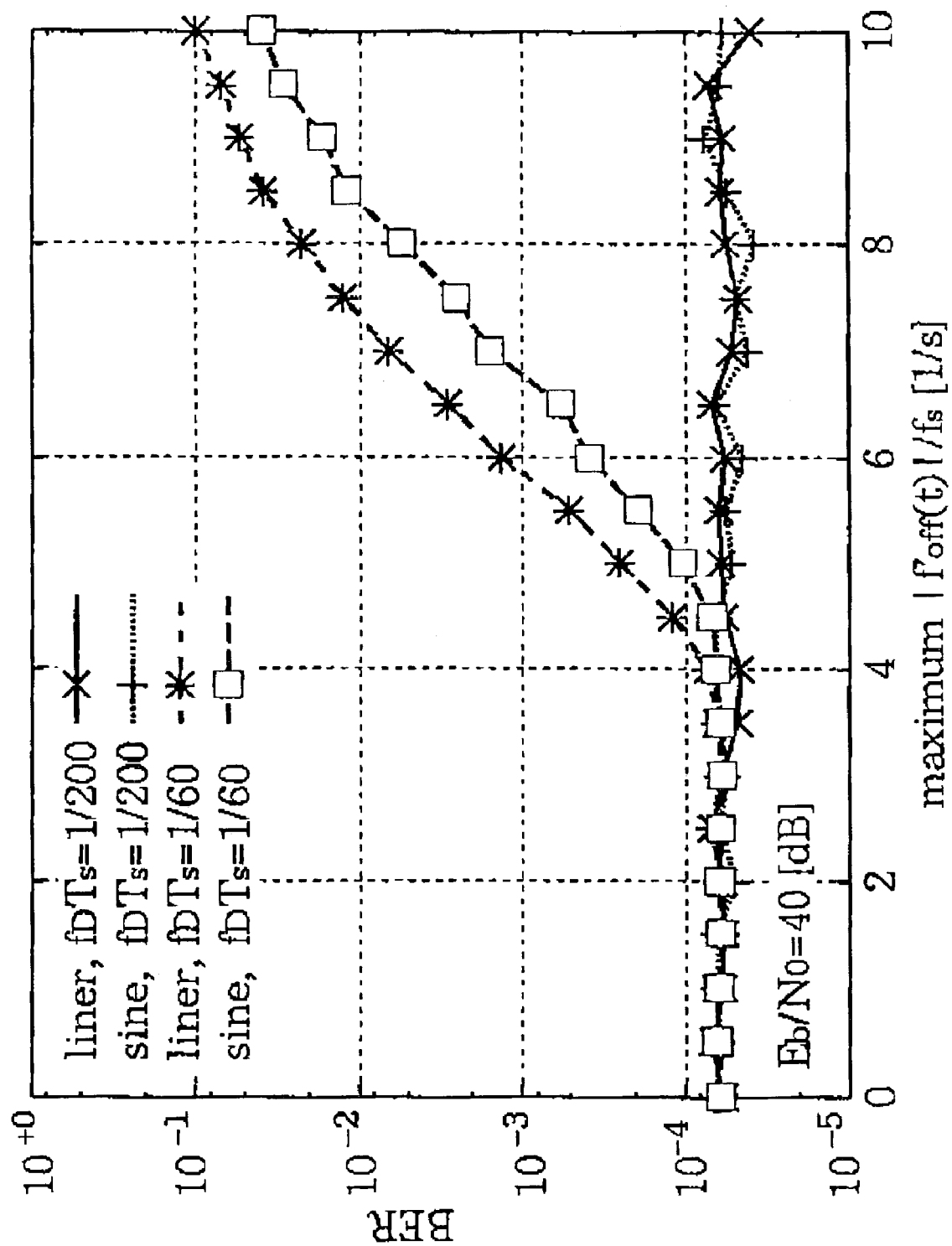
FIG. 20 is a graph of the closed-loop BER versus the rate of change of the normalized frequency offset $f_{off}/f_s$.

The performance of being able to follow these rates of change without being affected by LPF deterioration was evaluated by measuring the BER. FIGS. 19 and 20 show the BER versus the rate of change of the normalized frequency offset $f_{off}'(t)/f_S$ when $E_b/N_0$=40 dB, for the open-loop and closed-loop schemes, respectively. In both cases, when fading is slow, good performance was exhibited up until $f_{off}'(t)(t)/f_S$=10. When fading is fast, the performance deteriorated gradually in the open-loop scheme, but in the closed-loop scheme, nearly perfect following was achieved up to roughly $f_{off}'(t)(t)/f_S$=4. However, one can say that compensation is good up until $f_{off}'(t)(t)/f_S$=1. When this $f_{off}'(t)(t)/f_S$=1, in a system with a transmission rate of 1.6 Mbps and RF frequency of 10 GHz, this is equal to the state in which the change in velocity is a maximum of 475.8 km/s$^2$. This is sufficient to permit an actual mobile station system.

These results demonstrate that this method can perform compensation with good performance at fast fading from the pilot symbols and a large frequency offset and even in the case that the offset changes.

With the constitution described above, the present invention exhibits the following meritorious effects.

In digital communications using pilot signals, the present invention is able to receive radiofrequency signals, demodulate the digital signals carried by said radiofrequency signals, extract pilot signals from the received radiofrequency signals or demodulated digital signals, find a spectrum of the extracted pilot signals, find the fading components or frequency-offset components from said spectrum, and use one of these components to compensate the received radiofrequency signal or estimate and compensate the original digital from the demodulated digital signals, thereby achieving the simultaneous estimation and compensation of large frequency offsets at fast fading with high accuracy.

In addition, with the present invention, the estimation of frequency offsets may be performed with a simple construction from the center of the received signal spectrum, for example, so there is no need for unique words as in the first related art, and high transmission efficiency can be maintained.

In addition, with the present invention, there is no need for two or more consecutive pilots, so transmission efficiency higher than that of the second related art can be achieved.

Moreover, it is not a method wherein the frequency offset is calculated from the phase difference between two specific symbols as in the second related art, so it is possible to suppress the effect of phase noise and also a pilot symbol-based fading estimator in addition to a simple frequency offset estimator can perform frequency offset estimation simultaneously to a certain degree, so even more accurate estimation can be achieved. By combining pilot symbols with a simple frequency offset estimator, it is possible to perform estimation and compensation of fading and the frequency offset simultaneously.

In addition, with the fifth aspect of the present invention, the method was changed so that when the fading components or frequency-offset components are found, an error evaluation thereof is performed and the fading components or frequency-offset components are found based thereupon, so compensation can be performed with good accuracy.

In addition, with the seventh aspect in particular, when the error between the fed back value of the frequency-offset components and its true value becomes an integral multiple of the inverse of the transmission symbol interval time, that error is reset, so that a small number of pilot signals can have a wide range of compensation of frequency offsets.

In addition, with the eleventh or twelfth aspects of the present invention in particular, the proportion of compensated frames is changed according to the value of the fading components, so that a small number of pilot signals can have a wide range of compensation of fading.

What is claimed is:

1. A transmission method with compensation for fading distortion or frequency offset distortion in digital communications using pilot signals, comprising:
    receiving radiofrequency signals modulated by one of amplitude modulation, frequency modulation, phase modulation, and polarization modulation;
    demodulating digital signals carried by said received modulated radiofrequency signals;
    oversampling said demodulated digital signals at a predetermined frequency;
    finding a spectrum of the oversampled signals using the oversampled signals as periodic pilot symbols;
    finding fading components or frequency-offset components from said spectrum using an averaging means in a closed loop scheme in which frequency offset is estimated in a unit of delay of frames and compensated by changing a base frequency of demodulation by the estimated delay of frames wherein, at a time of finding the fading components or frequency-offset components, performing an evaluation of a bandwidth of a spectrum of the fading components by a predetermined method, and depending on these results, changing the method of finding the fading components or frequency-offset components; and
    using one of said fading components or frequency-offset components to compensate said received modulated radiofrequency signals or estimate the original digital signal from the demodulated digital signals.

2. The transmission method with compensation for fading distortion or frequency offset distortion according to claim 1, further comprising:
    feeding said fading components or said frequency-offset components found in the closed loop scheme to a compensator to compensate the received radiofrequency signals or estimate the original digital signals from the demodulated digital signals.

3. The transmission method with compensation for fading distortion or frequency offset distortion according to claim 1, further comprising:
    performing the evaluation of the bandwidth of the spectrum of the fading components by a predetermined method,
    if the bandwidth of the spectrum of the fading components is small, increasing a ratio of a number of frames on which compensation is performed to a number of frames used at a time of calculating the bandwidth of the spectrum of the fading components, and
    if the bandwidth of the spectrum of the fading components is large, decreasing the ratio.

4. The transmission method with compensation for fading distortion or frequency offset distortion according to claim 1, wherein furthermore:
    the method of demodulating the digital signals is a method using a base frequency signal, and
    said base frequency is determined in part by a feedback of said fading components or frequency-offset components.

5. The transmission method with compensation for fading distortion or frequency offset distortion according to claim 4, wherein:
    the frequency-offset components provided as feedback increase or decrease said base frequency by an integral multiple of an inverse of the transmission symbol interval time.

6. The transmission method with compensation for fading distortion or frequency offset distortion according to claim 4, wherein:
    values of the frequency-offset components provided as feedback are automatically caused to converge to an integral multiple of an inverse of a transmission symbol interval time thereby reducing the frequency-offset components to approach zero.

7. The transmission method with compensation for fading distortion or frequency offset distortion according to any of claims 1, 2, 3, or 6, wherein the frequency-offset components are used to compensate the received radiofrequency signal or estimate the original digital signal from the demodulated digital signals.

8. The transmission method with compensation for fading distortion or frequency offset distortion according to claim 7, wherein:
    at the time of finding the spectrum of the oversampled signals as periodic pilot symbols, a process of limiting the frequency-offset components found from said spectrum to within a bandwidth of a receiving low-pass filter is performed.

9. The transmission method with compensation for fading distortion or frequency offset distortion according to claim 1, further comprising:
    depending on a value of the fading components found from said spectrum, if the fading component is small, increasing a ratio of a number of frames on which compensation is performed to a number of frames using compensation at a time of evaluating the fading components, and if the fading component is large, decreasing the ratio.

10. The transmission method with compensation for fading distortion or frequency offset distortion according to claim 9, wherein:
    a proportion of the number of frames on which compensation is performed to a number of frames using compensation at a time of evaluating the fading bandwidth is varied so as to be inversely proportional to the fading bandwidth.

11. The transmission method with compensation for fading distortion or frequency offset distortion according to claim 2, further comprising:

performing the evaluation of the bandwidth of the spectrum of the fading components by a predetermined method, if the bandwidth of the spectrum of the fading components is small, increasing a ratio of a number of frames on which compensation is performed to a number of frames used at a time of calculating the bandwidth of the spectrum of the fading components, and if the bandwidth of the spectrum of the fading components is large, decreasing the ratio.

12. The transmission method with compensation for fading distortion of frequency offset distortion according to claim 2, wherein furthermore:

the method of demodulating the digital signals is a method using a base frequency signal, and said base frequency is determined in part by a feedback of said fading components or frequency-offset components.

13. The transmission method with compensation for fading distortion or frequency offset distortion according to claim 3, wherein furthermore:

the method of demodulating the digital signals is a method using a base frequency signal, and in the closed loop scheme, said base frequency is determined in part by a feedback of said fading components or frequency-offset components.

14. The transmission method with compensation for fading distortion or frequency offset distortion according to claim 12, wherein:

the frequency-offset components provided as feedback increase or decrease said base frequency by an integral multiple of an inverse of a transmission symbol interval time.

15. The transmission method with compensation for fading distortion or frequency offset distortion according to claim 13, wherein:

the frequency-offset components provided as feedback increase or decrease said base frequency by an integral multiple of an inverse of a transmission symbol interval time.

16. The transmission method with compensation for fading distortion or frequency offset distortion according to claim 12, wherein:

values of the frequency-offset components provided as feedback are automatically caused to converge to an integral multiple of an inverse of a transmission symbol interval time thereby reducing the frequency-offset components to approach zero.

17. The transmission method with compensation for facing distortion of frequency offset distortion according to claim 13, wherein:

values of the frequency-offset components provided as feedback are automatically caused to converge to an integral multiple of an inverse of a transmission symbol interval time thereby reducing the frequency-offset components to approach zero.

18. The transmission method with compensation for fading distortion or frequency offset distortion according to claim 2, further comprising:

depending on a value of the fading components found from said spectrum, if the fading component is small, increasing a ratio of a number of frames on which compensation is performed to a number of frames using compensation at a time of evaluating the fading components, and if the fading component is large, decreasing the ratio.

19. The transmission method with compensation for fading distortion or frequency offset distortion according to claim 2, further comprising:

depending on a value of the fading components found from said spectrum, if the fading component is small, increasing a ratio of a number of frames on which compensation is performed to a number of frames using compensation at a time of evaluating the fading components, and if the fading component is large, decreasing the ratio.

20. The transmission method with compensation for fading distortion or frequency offset distortion according to claim 3, further comprising:

depending on a value of the fading components found from said spectrum, if the fading component is small, increasing a ratio of a number of frames on which compensation is performed to a number of frames using compensation at a time of evaluating the fading components, and if the fading component is large, decreasing the ratio.

21. The transmission method with compensation for fading distortion or frequency offset distortion according to claim 20, wherein:

a proportion of the number of frames on which compensation is performed to a number of frames using compensation at a time of evaluating the fading bandwidth is varied so as to be inversely proportional to the fading bandwidth.

22. The transmission method with compensation for fading distortion or frequency offset distortion according to any of claims 11 to 17, wherein the frequency-offset components are used to compensate the received radiofrequency signal or estimate the original digital signal from the demodulated digital signals.

23. The transmission method with compensation for fading distortion or frequency offset distortion according to any of claims 11 to 17, wherein:

at the time of finding the spectrum of the oversampled signals as periodic pilot symbols, a process of limiting the frequency-offset components found from said spectrum to within a bandwidth of a receiving low-pass filter is performed.

* * * * *